(12) United States Patent
Sakurai et al.

(10) Patent No.: US 8,195,000 B2
(45) Date of Patent: *Jun. 5, 2012

(54) IMAGE PICKUP APPARATUS

(75) Inventors: Keiichi Sakurai, Akishima (JP); Takaaki Yui, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/190,279

(22) Filed: Jul. 25, 2011

(65) Prior Publication Data

US 2011/0279711 A1    Nov. 17, 2011

Related U.S. Application Data

(62) Division of application No. 11/895,466, filed on Aug. 24, 2007, now Pat. No. 8,036,486.

(30) Foreign Application Priority Data

Sep. 6, 2006   (JP) .................. 2006-241704

(51) Int. Cl.
G06K 9/40   (2006.01)
G06K 9/36   (2006.01)

(52) U.S. Cl. .................. 382/274; 382/284; 382/255

(58) Field of Classification Search .................. None
See application file for complete search history.

(56) References Cited

U.S. PATENT DOCUMENTS

| | | |
|---|---|---|
| 5,838,837 A | 11/1998 | Hirosawa et al. |
| 5,974,113 A | 10/1999 | Bruijns et al. |
| 6,735,330 B1 | 5/2004 | Van Metter et al. |
| 7,057,645 B1 | 6/2006 | Hara et al. |
| 7,379,561 B2 | 5/2008 | Chauville et al. |
| 7,415,133 B2 | 8/2008 | Ikeda et al. |
| 7,609,320 B2 | 10/2009 | Okamura |
| 7,817,186 B2 | 10/2010 | Tamamura |
| 7,834,925 B2 * | 11/2010 | Kim .............................. 348/335 |
| 7,907,790 B2 * | 3/2011 | Inazumi ........................ 382/274 |
| 2002/0047911 A1 | 4/2002 | Tsuchiya et al. |
| 2002/0135688 A1 | 9/2002 | Niikawa |

(Continued)

FOREIGN PATENT DOCUMENTS

CN    1685710 A    10/2005

(Continued)

OTHER PUBLICATIONS

Japanese Office Action dated Sep. 1, 2009 (4 pages), and English translation thereof (7 pages), issued in counterpart Japanese Application Serial No. 2006-241704.

(Continued)

*Primary Examiner* — Michelle Entezari
(74) *Attorney, Agent, or Firm* — Holtz, Holtz, Goodman & Chick, PC

(57) ABSTRACT

An image pickup apparatus is provided which informs a user of a state of brightness adjusting operation and which has excellent usability for the user. Disclosed is a digital camera including an image adder 5d for synthesizing a plurality of continuously taken image frames to produce a synthesized image, an image processing apparatus 5 for executing image brightness adjusting processing for synthesizing a required synthesis number of image frames and adjusting brightness of the synthesized image at the time of continuous picture-taking of a subject, and a display device for displaying an image which is being synthesized by the image adder in the image brightness adjusting processing.

4 Claims, 19 Drawing Sheets

U.S. PATENT DOCUMENTS

| | | |
|---|---|---|
| 2003/0117518 A1 | 6/2003 | Pyle |
| 2004/0145673 A1 | 7/2004 | Washisu |
| 2004/0238718 A1 | 12/2004 | Washisu |
| 2006/0083438 A1 | 4/2006 | Donomae et al. |
| 2006/0140604 A1 | 6/2006 | Suda |
| 2006/0238623 A1 | 10/2006 | Ogawa |
| 2006/0239583 A1 | 10/2006 | Safonov |
| 2009/0225201 A1 | 9/2009 | Abe et al. |

FOREIGN PATENT DOCUMENTS

| | | |
|---|---|---|
| JP | 2004-140484 A | 5/2004 |
| JP | 2004-219765 A | 8/2004 |
| JP | 2005-38396 A | 2/2005 |
| JP | 2005-354166 A | 12/2005 |
| JP | 2006-20096 A | 1/2006 |
| JP | 2006-54698 A | 2/2006 |
| JP | 2006-166252 A | 6/2006 |
| TW | 200417258 A | 9/2004 |
| WO | WO 2006064936 A1 | 6/2006 |

OTHER PUBLICATIONS

Chinese Office Action dated Nov. 12, 2010 (and English translation thereof) in counterpart Chinese Application No. 200780001751.3.

U.S. Appl. No. 12/397,726; First Named Inventor: Yoshito Abe; Title: "Image Synthesizing Apparatus and Image Pickup Apparatus With a Brightness Adjusting Processing".

Taiwanese Office Action dated Apr. 25, 2011 (and English translation thereof) in counterpart Taiwanese Application No. 096133021.

Korean Office Action dated May 19, 2009 issued in counterpart Korean Application No. 10-2008-7011034.

* cited by examiner

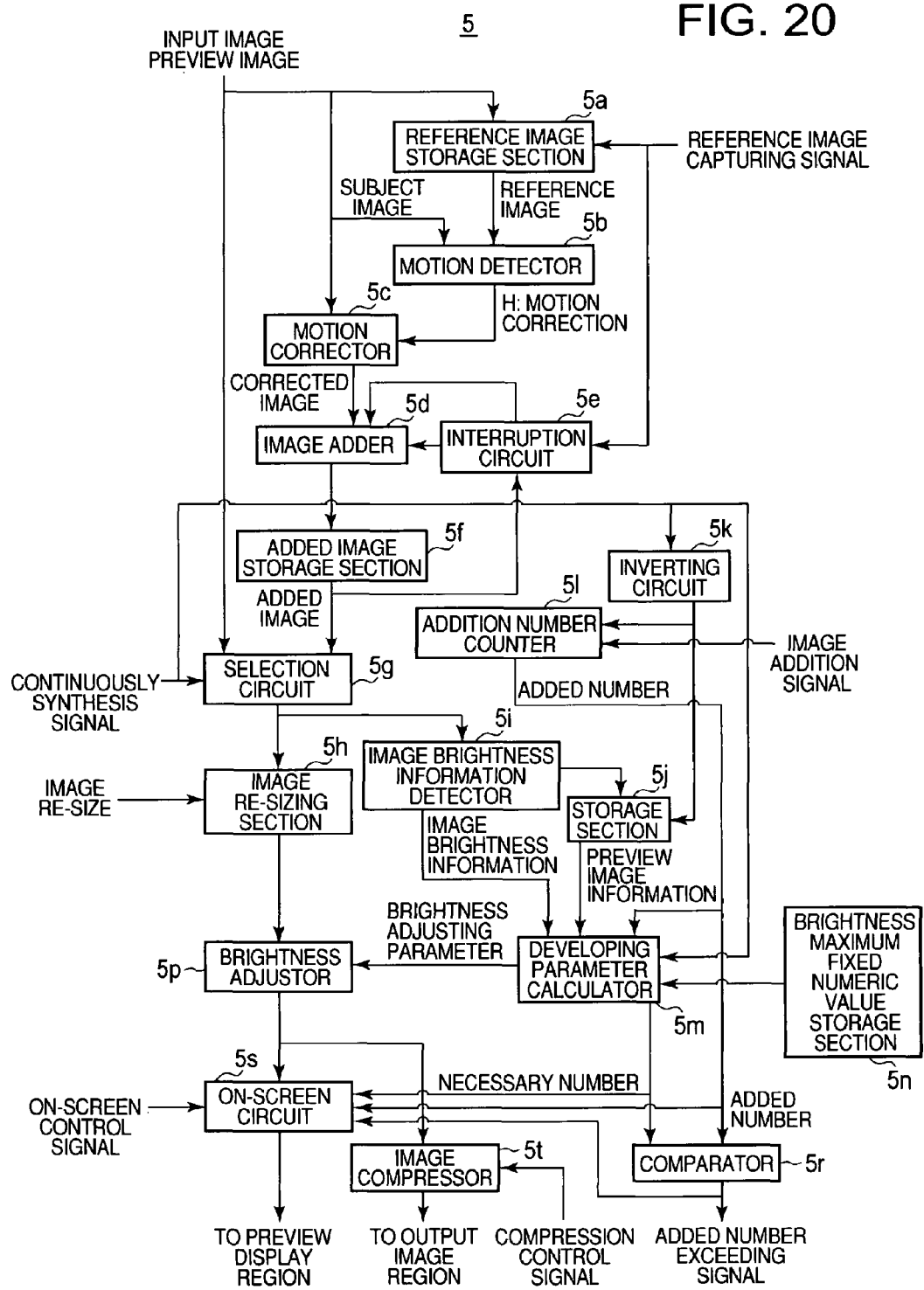

IMAGE PICKUP APPARATUS

CROSS-REFERENCE TO RELATED APPLICATIONS

This is a Divisional Application of U.S. application Ser. No. 11/895,466 filed Aug. 24, 2007 now U.S. Pat. No. 8,036,486, which application is based upon and claims the benefit of priority from the prior Japanese Patent Application No. 2006-241704, filed Sep. 6, 2006, the entire contents of both of which are incorporated herein by reference.

BACKGROUND OF THE INVENTION

1. Field of the Invention

The present invention relates to an image pickup apparatus which synthesizes a plurality of image frames produced by continuously taking images of a subject to produce a synthesized image.

2. Description of Related Art

A conventional image pickup apparatus such as a digital camera forms an optical image of a subject by means of an optical lens, and converts the optical image into an electric signal by means of an image pickup device such as a CMOS image sensor.

As a method for taking images in a dark place, there is known a method in which images of a subject are continuously taken with exposure time having smaller hand jiggle, the images are added while correcting motion of the plurality of images, thereby producing one image.

In the case of the patent document 1, however, a predetermined number of images are collectively continuously taken previously and then, the images are synthesized into one image. Therefore, if a long time is required to obtain the last image after the start of the image-taking processing, it takes lots of time to take photograph again when a user recognizes the image-taking processing has failed.

Further, since the number of images to be synthesized is predetermined, when images are taken in an extremely dark place, there is a problem that even if the predetermined pieces of images are synthesized, the image does not become sufficiently bright.

When an image of a person is taken in a dark place against a night piece backdrop, a difference in brightness between a face of the person and a bright portion of the night piece is large. Therefore, there is a problem that in order to sufficiently brighten the face of the person to sufficiently provide gradation, the number of images to be synthesized must be sufficiently high so that the synthesized image is sufficiently bright.

The sufficient and necessary number of continuously taken images is varied depending upon an image-taking condition of a subject. It seems possible to always take images more than necessary to avoid the shortage of the number of images to be synthesized, but there is a problem that a user must hold the camera for a long time without jiggling his or her hand.

SUMMARY OF THE INVENTION

Hence, it is an object of the present invention to provide an image pickup apparatus having excellent usability and capable of informing a user of an image synthesis state during image taking operation.

According to one aspect of the present invention, an image pickup apparatus comprises: a picture-taking section to continuously take pictures of a subject to output a plurality of image frames; an image synthesizing section to synthesize the plurality of image frames to produce a synthesized image; an image brightness adjusting section which allows the image synthesizing section to synthesize the image frames and executes image brightness adjusting processing for adjusting brightness of the synthesized image in continuous shooting by the picture-taking section; and a halfway-image display section to display an image which is being synthesized by the image synthesizing section in the image brightness adjusting processing.

According to the present invention, the image pickup apparatus synthesizes a plurality of image frames, and a user can know a state where the brightness of the synthesized image is adjusted. Therefore, a user can know the current state of images during picture taking, and it is possible to provide an image pickup apparatus having excellent usability.

BRIEF DESCRIPTION OF THE DRAWINGS

FIG. 20 is a block diagram showing a structure of an essential portion of image processing apparatus provided in a digital camera of a second modification;

DETAILED DESCRIPTION OF THE PREFERRED EMBODIMENT

Concrete embodiments of the present invention will be explained using the drawings. The scope of the invention is not limited to the illustrated examples.

First Embodiment

Figure 1:
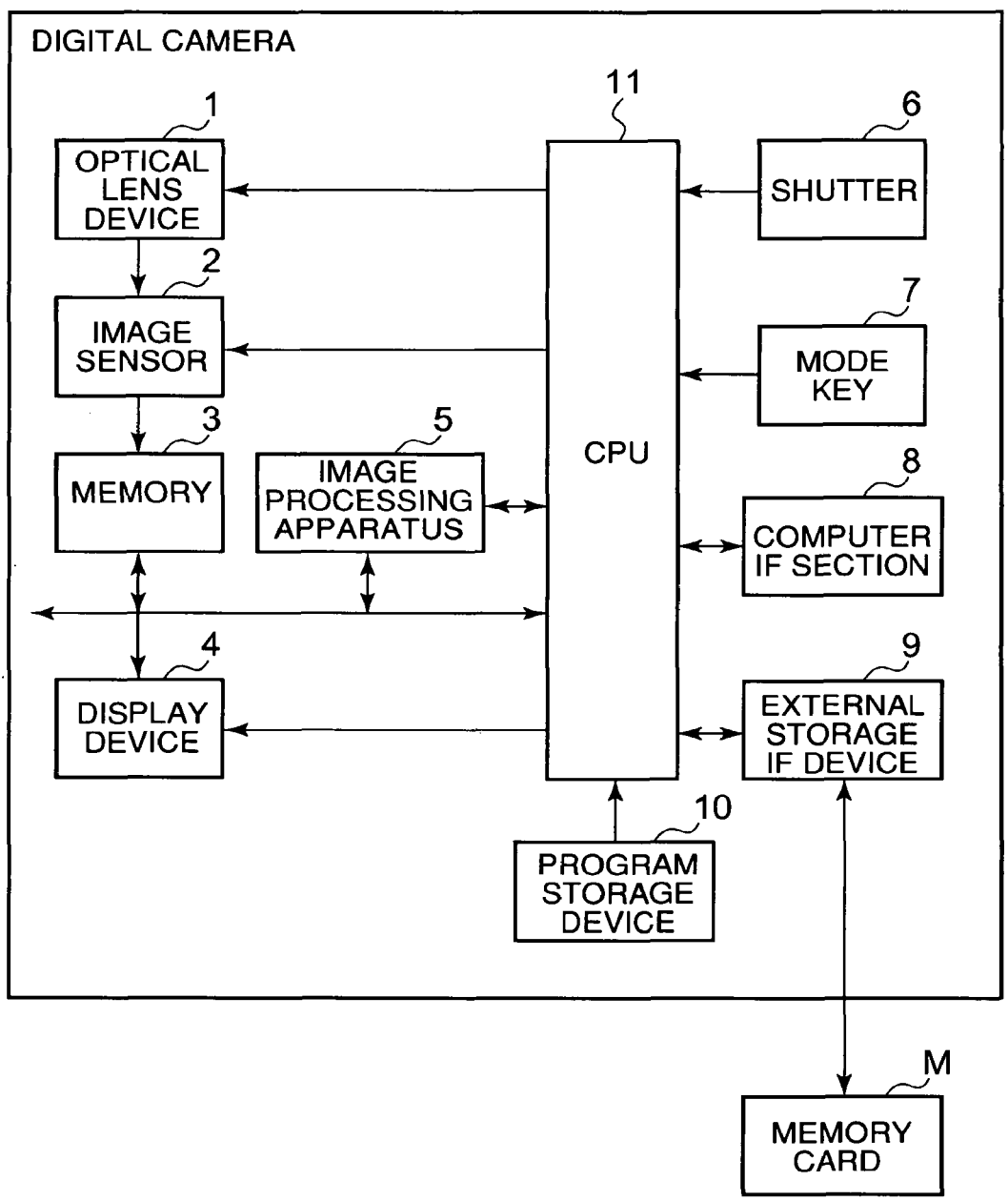
FIG. 1 is a schematic block diagram showing a structure of a digital camera according to a first embodiment to which the present invention is applied.

FIG. 1 is a block diagram showing an outline structure of a digital camera 100 of the first embodiment to which the present invention is applied.

The digital camera (image pickup apparatus) 100 of the first embodiment has a single picture-taking mode in which a normal image-taking action is carried out with predetermined exposure time, and a continuous picture-taking mode in which images of a subject are continuously taken with exposure time shorter than that of the single picture-taking mode, a plurality of image frames are added (synthesized) to produce a single image.

More specifically, the digital camera 100 includes an optical lens device 1, an image sensor 2, a memory 3, a display device 4, an image processing apparatus 5, a shutter 6, a mode key 7, a computer IF section 8, an external storage IF device 9, a program storage device 10 and a CPU 11.

The shutter 6 outputs a picture-taking command of a subject to the CPU 11.

That is, the shutter 6 constitutes a picture-taking operation input section which outputs and inputs a picture-taking command of a subject using the optical lens device 1 and the image sensor 2 to and from the CPU 11 based on a push-down operation by a user in the continuous picture-taking mode.

The mode key 7 comprises a dial for selecting a picture-taking mode based on operation of a user. More concretely, the single picture-taking mode, the continuous picture-taking mode and the like can be selected using the mode key 7.

The optical lens device 1 includes a picture-taking lens and its driving section, and collects light reflected by a subject and forms an image on the image sensor 2.

The image sensor 2 includes a CCD. The image sensor 2 and captures the formed image as digitalized image data.

The image sensor 2 is controlled by the CPU 11. When a user does not push down the shutter 6, the image sensor 2 produces a high speed frame (digital image data) having shorter exposure time for preview, periodically reads about 30 image data per one second and outputs the same to the memory 3. If the shutter 6 is pushed down by a user, the image sensor 2 produces image data of high-resolution image data and outputs the image data to the memory 3.

The image sensor 2 can adjust the picture-taking sensitivity (ISO sensitivity) in accordance with brightness of a subject under control of the CPU 11.

While the shutter 6 is pushed down by a user in the continuous picture-taking mode, the image sensor 2 carries out exposure a plurality of times continuously for a short time as a picture-taking section, thereby continuously taking images of a subject, and outputs a plurality of image frames.

The memory 3 temporarily stores preview image data which is output from the image sensor 2, high-resolution image data, original image data which is image-processed by the image processing apparatus 5, and processed image data. The memory 3 outputs the temporarily stored image data to the display device 4 or the image processing apparatus 5.

The memory 3 is also used as a working area memory of the CPU 11.

The image processing apparatus 5 carries out image synthesizing processing, developing processing of added image, and compressing processing of image data for image data which is temporarily stored.

The image processing apparatus 5 will be explained in detail with reference to FIG. 2.

Figure 2:
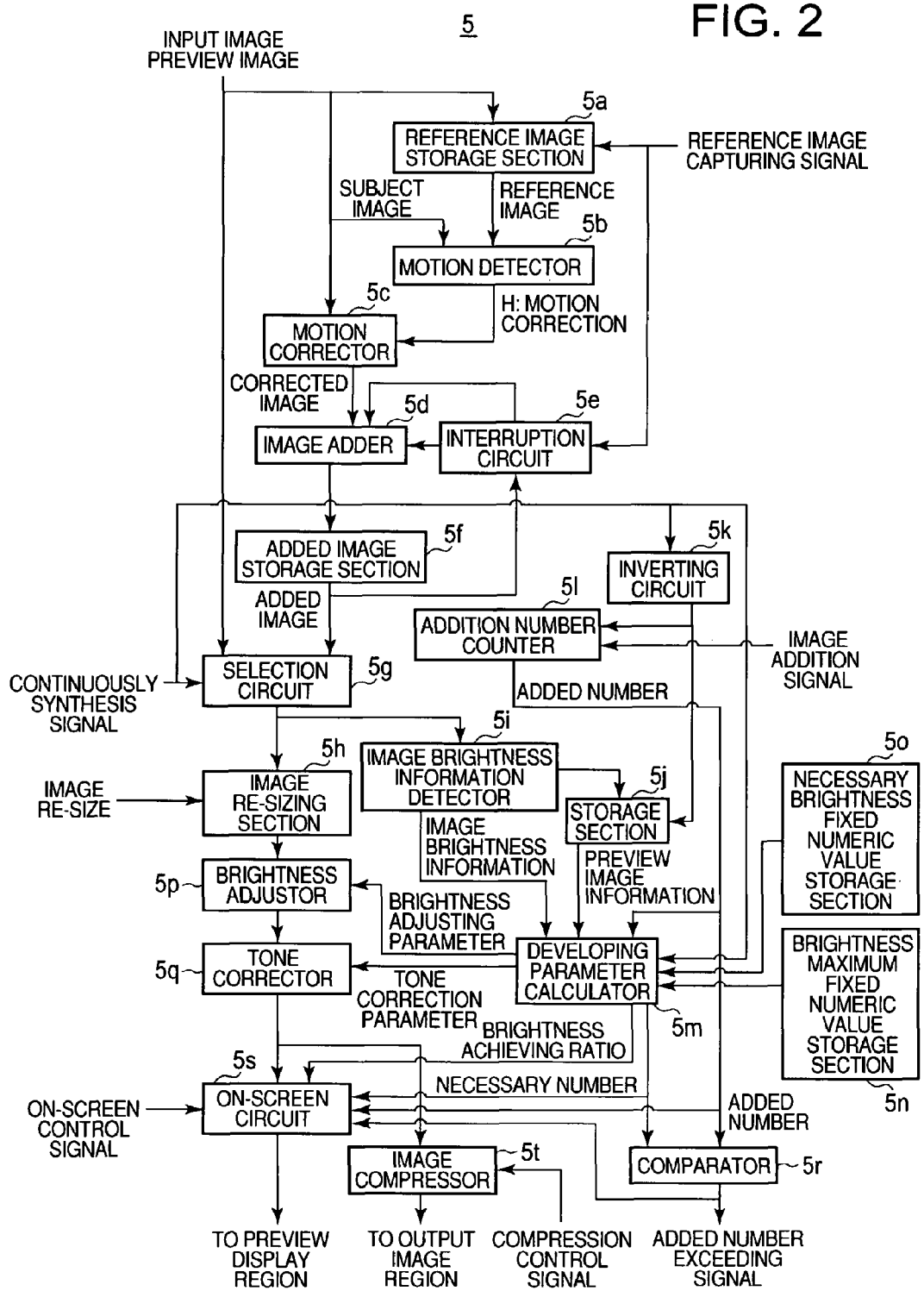
FIG. 2 is a block diagram showing a structure of an essential portion of an image processing apparatus provided in the digital camera shown in FIG. 1.

As shown in FIG. 2, the image processing apparatus 5 includes a reference image storage section 5a, a motion detector 5b, a motion corrector 5c, an image adder 5d, an interruption circuit 5e, an added image storage section 5f, a selection circuit 5g, an image re-sizing section 5h, an image brightness information detector 5i, a storage section 5j, an inverting circuit 5k, an addition number counter 5l, a developing parameter calculator 5m, a brightness maximum fixed numeric value storage section 5n, a necessary brightness fixed numeric value storage section 5o, a brightness adjustor 5p, a tone corrector 5q, a comparator 5r, an on-screen circuit 5s, an image compressor 5t and the like.

The reference image storage section 5a stores an image frame which is input from the image sensor 2 as a reference image.

The reference image storage section 5a outputs the stored reference image to the motion detector 5b. More specifically, the reference image storage section 5a outputs the same image as an input image as the reference image while a reference image take-in signal which is output from the CPU 11 is input.

The motion detector 5b compares and determines a reference image which is output and input from the reference image storage section 5a and an object image which is output and input from the image sensor 2 with each other, and detects motion. That is, the motion detector 5b compares and determines a first reference image and an object image with each other as a criterion image for detecting a motion amount of second and subsequent images.

For example, when an image which is same as the image input from the reference image storage section 5a is output, the motion detector 5b determines that the output image and an object image which is output from the image sensor 2 are the same, and outputs a motion correction H as no motion.

The motion corrector 5c carries out motion correction: H of an image which is output and input from the image sensor 2, and outputs a corrected image. Since motion correction is not required when the image is a first image, the motion corrector 5c outputs the input image to the image adder 5d as a correction image signal as it is.

The image adder 5d adds (synthesizes) a plurality of image frames which are output and input from the image sensor 2 as an image synthesizing section, and produces an added image. That is, the image adder 5d add a corrected image signal which is output and input from the motion corrector 5c in the continuous picture-taking mode (which will be described later) and an added image which is output from the added image storage device and which is input through the interruption circuit 5e.

When a reference image take-in signal is input to a control terminal of the interruption circuit 5e, a signal which is input to the interruption circuit 5e is interrupted and "0" is output. Therefore, the image adder 5d outputs image data which is output and input from the motion corrector 5c to the added image storage section 5f.

The addition of image is executed while the shutter 6 is pushed down by a user. Therefore, sufficient bit width to prevent overflow is secured in the image adder 5d, even if images more than necessary are added.

The added image storage section 5f stores image data which is output and input from the image adder 5d.

The added image storage section 5f outputs stored image data (added image) to the selection circuit 5g and the interruption circuit 5e.

The selection circuit 5g switches between a signal which is output from the image sensor 2 and a signal which is output from the added image storage section 5f based on a continuous picture-taking and synthesizing signal which is output and input from the CPU 11. More specifically, when the continuous picture-taking and synthesizing signal is "0", the selection circuit 5g selects input of a signal which is output from the image sensor 2, and when the continuous picture-taking and synthesizing signal is "1", the selection circuit 5g selects input of a signal which is output from the added image storage section 5f.

The selection circuit 5g outputs the input signal to the image re-sizing section 5h and the image brightness information detector 5i.

The image re-sizing section 5h changes a size of an image which is output and input from the selection circuit 5g based on an image re-size signal which is output and input from the CPU 11. The image re-sizing section 5h sets an image size to the minimum image size (QVGA size) for preview image or the maximum image size for a real picture-taking image and changes.

The image re-sizing section 5h outputs an image after it was re-sized to the brightness adjustor 5p.

The image brightness information detector 5i detects brightness information of an image based on an input image. More specifically, the image brightness information detector 5i converts brightness based on an input image signal, selects a measuring region portion (image central portion or the like) for measuring brightness of the image, and prepares a histogram. When image data sets are sequentially input, the histogram is measured whenever image data of the image central portion is input.

The image brightness information detector 5i detects a brightness distribution of an image based on the measured histogram, and outputs the brightness distribution to the developing parameter calculator 5m and the storage section 5j as image brightness information.

The storage section 5j stores image brightness information which is output and input from the image brightness information detector 5i based on input of an inverted signal "1" which is output from the inverting circuit 5k.

The addition number counter 5l counts addition number which is the number of added (synthesized) image frames and adds 1 to a counter value as an synthesis number measuring section based on an image addition signal which is output and input from the CPU 11.

When the continuous picture-taking and synthesizing signal is "0", the signal is inverted to "1" by the inverting circuit 5k, and is input to a clear signal terminal, and the addition number counter 5l clears the counter value (to "0").

The addition number counter 5l outputs the addition number to the on-screen circuit 5s and the comparator 5r.

Whenever the image brightness information which is output from the image brightness information detector 5i is input to the developing parameter calculator 5m, the developing parameter calculator 5m gain-adjusts the brightness of the output image from the average value of the histogram based on the image brightness information.

The developing parameter calculator 5m outputs the calculated brightness gain to the brightness adjustor 5p as a brightness adjusting parameter.

The developing parameter calculator 5m calculates the number (required synthesis number) of image frames required for synthesizing images as a required synthesis number calculating section. That is, the developing parameter calculator 5m calculates the required synthesis number of image frames which is required for an added image produced by the image adder 5d for obtaining the same brightness as that of an image which is taken in the normal single picture-taking mode (picture-taking method) based on brightness of an image (input image) of a subject.

More concretely, when the brightness of the input image is 1/B with respect to brightness required for obtaining a predetermined S/N value, $B^2$ number of images are required for obtaining a predetermined S/N value by synthesizing. Therefore, when the brightness adjusting parameter (brightness gain) of the image brightness information is B, the number required for continuous picture-taking is $B^2$. When the brightness of a subject is 1/2.8 with respect to a desired brightness, the necessary number is $2.8^2 (\approx 8)$.

The developing parameter calculator 5m outputs the calculated necessary number to the on-screen circuit 5s.

The developing parameter calculator 5m calculates a ratio of the brightness of the added image and the necessary brightness required for achieving the desired S/N value ("brightness achievement ratio k", hereinafter).

That is, the developing parameter calculator 5m calculates the brightness achievement ratio k in accordance with the following equation (1) based on the average brightness calculated based on the image brightness information of the added image and based on a brightness fixed numeric value stored in the necessary brightness fixed numeric value storage section 5o, i.e., a numeric value which defines almost the same brightness as that of an image which is taken by a normal picture-taking method and which has a predetermined S/N value.

$$\text{Brightness achievement ratio } k \cong \frac{(\text{necessary brightness})^2}{\left(\frac{\text{average brightness of added image}}{\text{addition number}}\right)^2 \times \text{addition number}} \quad \text{Equation 1}$$

$$\frac{(\text{necessary brightness})^2}{(\text{average brightness of added image})^2} \times \text{addition number}$$

$$\text{Displayed brightness achievement ratio } Lk(\%) = \begin{cases} 100 \times k & (k < 1.0) \\ 100 & (k \geq 1.0) \end{cases} \quad \text{Equation 2}$$

The developing parameter calculator 5m converts the calculated brightness achievement ratio k into % display ("brightness achievement ratio Lk (%)", hereinafter) in accordance with equation (2), and outputs the same to the on-screen circuit 5s.

The developing parameter calculator 5m calculates a tone correcting parameter by the tone corrector 5q based on the image brightness information of an added image which is output and input from the image brightness information detector 5i. Specifically, the developing parameter calculator 5m calculates the tone correcting parameter such that the brightness is equal to or lower than predetermined brightness until the added image reaches a desired S/N value and that a dark portion in the image becomes more bright as the addition number is increased.

Figure 3:
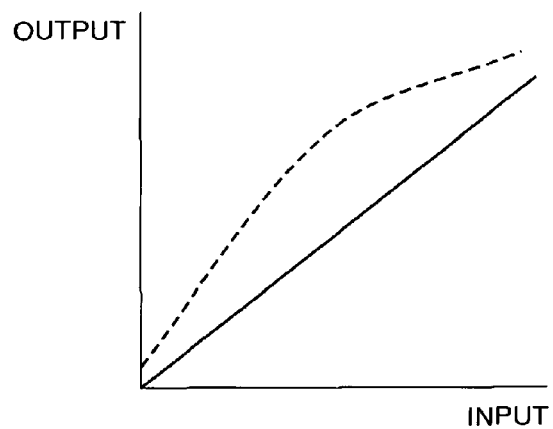
FIG. 3 is a schematic diagram showing tone curve concerning tone adjusting processing by the image processing apparatus shown in FIG. 2.

That is, the brightness achievement ratio k is applied, and the developing parameter calculator 5m calculates the tone correcting parameter such that a tone curve is changed to a straight line (solid line in FIG. 3) until the brightness achievement ratio k exceeds 1.0, and the tone curve is changed to such a curved line that a dark portion becomes more bright (broken line in FIG. 3) to adjust the extension amount of the dark portion.

The brightness adjustor 5p adjusts the brightness of the input image based on a brightness gain (brightness adjusting parameter) calculated by the developing parameter calculator 5m, and outputs the same to the tone corrector 5q and the image compressor 5t.

Even if an image having brightness of a certain level or higher is input, a number in which the brightness adjusting parameter is one or less is input, and the brightness adjustor 5p adjusts the brightness to an appropriate value.

The tone corrector 5q changes the tone curve, adjusts a tone of the input image, and outputs the same to the on-screen circuit 5s.

That is, the tone corrector 5q executes the tone adjusting processing for adjusting the tone of the added image as a tone adjusting section. More specifically, the tone corrector 5q changes the tone correcting parameter γ before and after the brightness of the added image reaches almost the same brightness of an image taken in the single picture-taking mode (normal picture-taking method) so that the tone adjusting processing becomes different. For example, when the brightness achievement ratio k exceeds 1.0, the tone corrector 5q changes the tone curve to such a curve (broken line in FIG. 3) that a dark portion of the image becomes more bright, thereby adjusting the extended amount of the dark portion.

To adjust the tone curve, γ correction using γ obtained by the brightness achievement ratio k is applied, a picture element x which is input to the following equation (3) is converted and is output as y by this γ correction.

$$y = x_{max} \times (x/x_{max})^{1/\gamma} \quad \text{Equation 3}$$

$$\gamma = \begin{cases} 1.0 & (k < 1.0) \\ 1.0 + a(k - 1.0) & (k \geq 1.0) \end{cases}$$

Here, the symbol a is a constant from 0 to 3, the symbol 0 represents "no change", as the value becomes higher, the variation amount in the extended amount of the dark portion per one shoot is increased.

The input picture element x is 0 or higher and equal to the maximum value $x_{max}$ or less. The maximum value $x_{max}$ is obtained by multiplying a value stored in the brightness maximum fixed numeric value storage section 5n by the addition number.

A correspondence relation between the brightness (average brightness L) of an output image, a brightness adjusting parameter G and a tone correcting parameter γ will be explained in more detail with reference to FIGS. 4 to 8.

Figure 4:
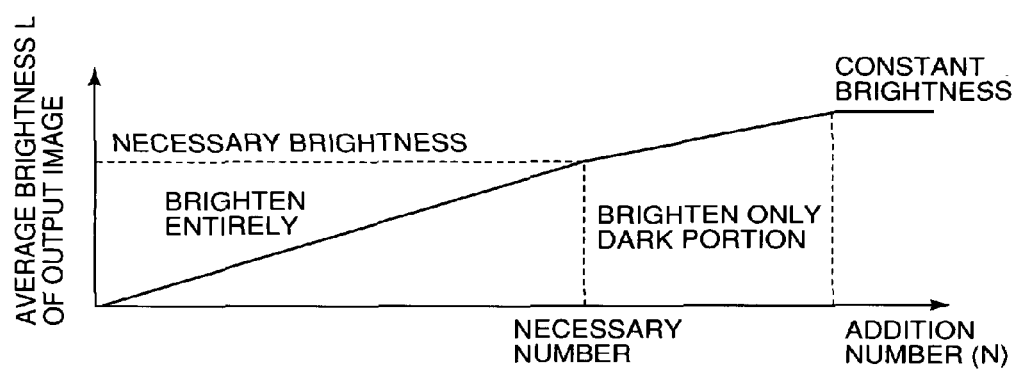
FIG. 4 is a diagram showing a correspondence relation between the addition number by the digital camera shown in FIG. 1 and brightness of output image.

FIG. 4 is a diagram showing a correspondence relation between the addition number (N) when images are continuously taken by a digital camera and brightness (average brightness L) of an image which is output in accordance with the addition number.

As shown in FIG. 4, the entire image is gradually brightened in accordance with the addition (synthesis) number until the output image obtains necessary brightness, but after the number reaches the necessary number, a bright portion is not further brightened so that overflow is not produced and only a dark portion is brightened.

If the dark portion is excessively brightened, contrast of the entire image is lowered. Therefore, when the addition number is further increased, control is performed such that the brightness of the output image becomes substantially constant and the image is output.

The operation of the digital camera under such control will be explained.

First, control for bringing brightness of an output image into a substantially constant value will be explained with reference to FIG. 5.

The brightness adjusting parameter G is calculated in accordance with the following equation (4) such that the average brightness of an output image becomes equal to the necessary brightness from the average value of the brightness of an input image detected by the image brightness information detector 5i.

Figure 5:
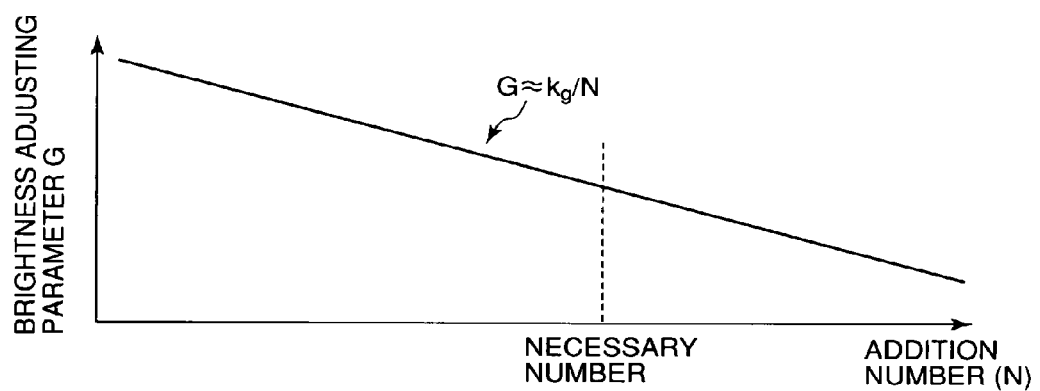
FIG. 5 is a diagram showing one example of a correspondence relation between the addition number and a brightness adjusting parameter concerning the image brightness adjusting processing by the digital camera shown in FIG. 1.

Here, since the brightness of the input image is in proportional to the addition number (N), the gain adjusting parameter G for obtain substantially constant brightness establishes the relation of the following equation (5) (see FIG. 5).

$$G = \frac{necessary brightness}{average brightness of added image} \quad \text{Equation 4}$$

$$G \approx kg/N$$

$$kg \approx 1/\sqrt{necessary number} \quad \text{Equation 5}$$

Figure 6:
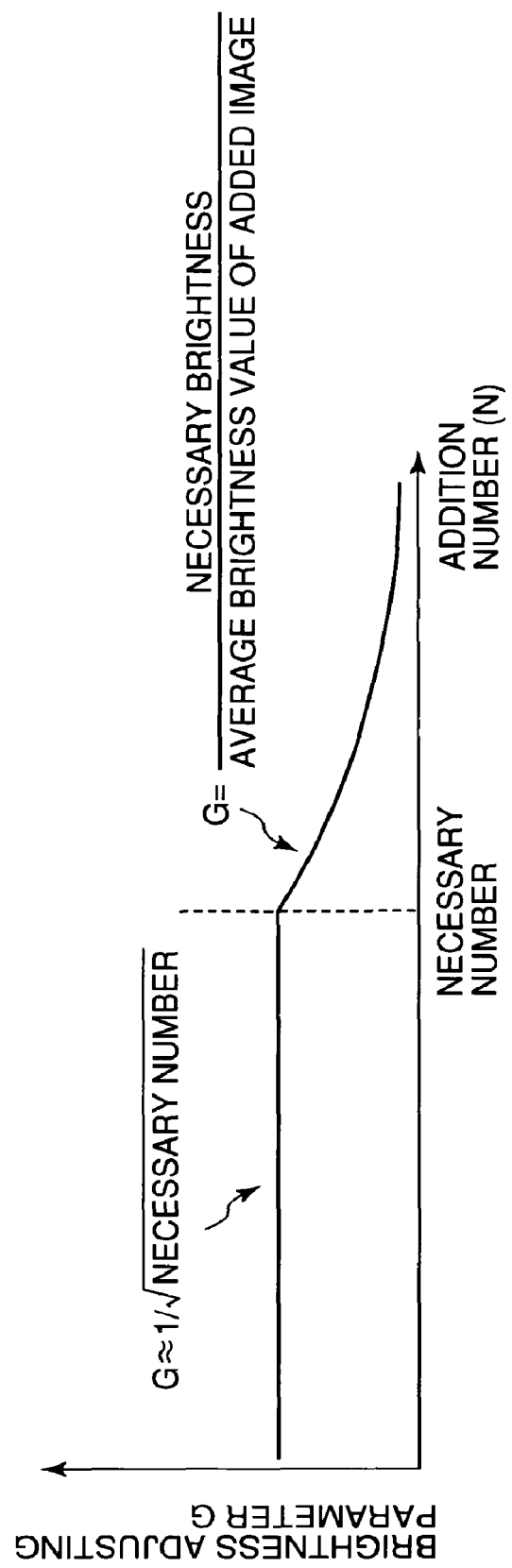
FIG. 6 is a diagram showing one example of a correspondence relation between the addition number and a brightness adjusting parameter concerning the image brightness adjusting processing by the digital camera shown in FIG. 1.

A case where control is performed such that an image is not brightened in a region having inferior S/N will be explained with reference to FIG. 6.

That is, an image before the number reaches the necessary number has inferior S/N, and if constant brightness is employed, noise is emphasized. Therefore, control is performed such that the brightness adjusting parameter G becomes equal to a substantially constant value in accordance with the following equation (6) until the number reaches the necessary number as shown in FIG. 6. With this, the brightness of the output image as show in FIG. 4 is obtained.

$$G \approx 1/\sqrt{necessary number} \quad \text{Equation 6}$$

A case where control is performed such that a noise level of an output image becomes constant will be explained with reference to FIG. 7.

Figure 7:
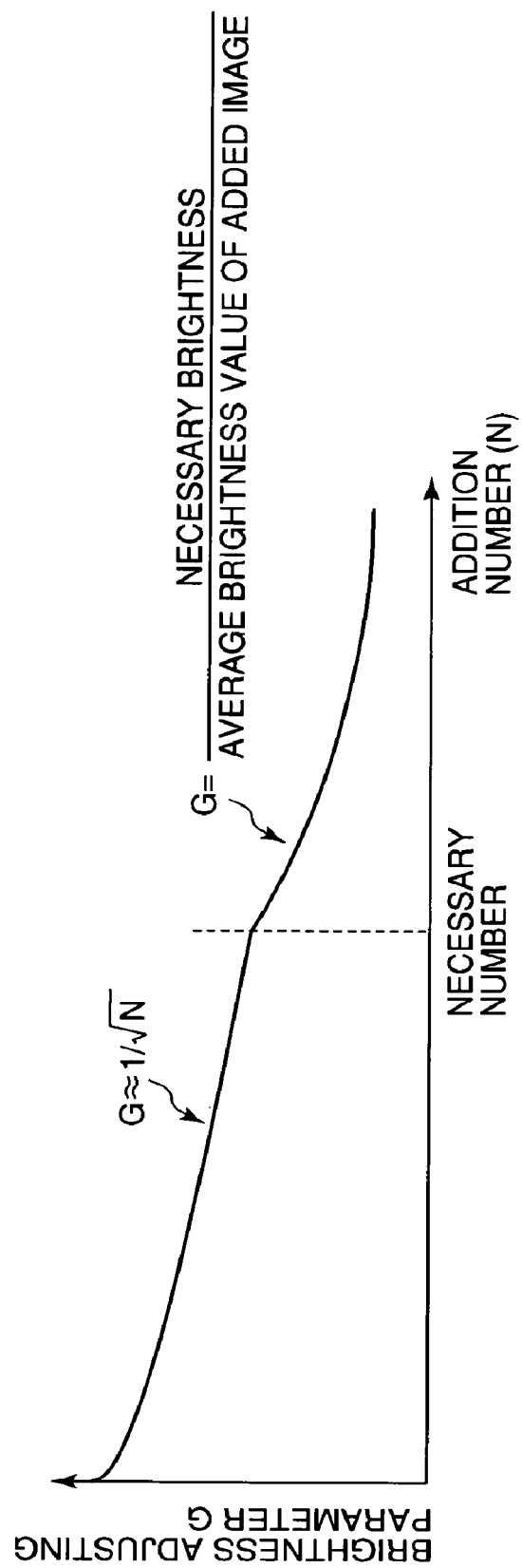
FIG. 7 is a diagram showing one example of a correspondence relation between the addition number and a brightness adjusting parameter concerning the image brightness adjusting processing by the digital camera shown in FIG. 1.

As shown in FIG. 7, the brightness adjusting parameter G is controlled in accordance with the following equation (7) until the number reaches the necessary number.

In this case, the brightness before the number reaches the necessary number is not varied straightly but is varied with $N^{1/2}$. That is, gain of a first image is $1/(\text{necessary number})^{1/2}$ in FIG. 6, but in the case shown in FIG. 6, brightness is 1 and thus the image is bright, and S/N becomes substantially constant until the number reaches the necessary number irrespective of the number of taken images.

$$G \approx 1/\sqrt{N} \quad \text{Equation 7}$$

Next, a case where brightness of an output image is controlled by tone correction will be explained with reference to FIG. 8.

Figure 8:
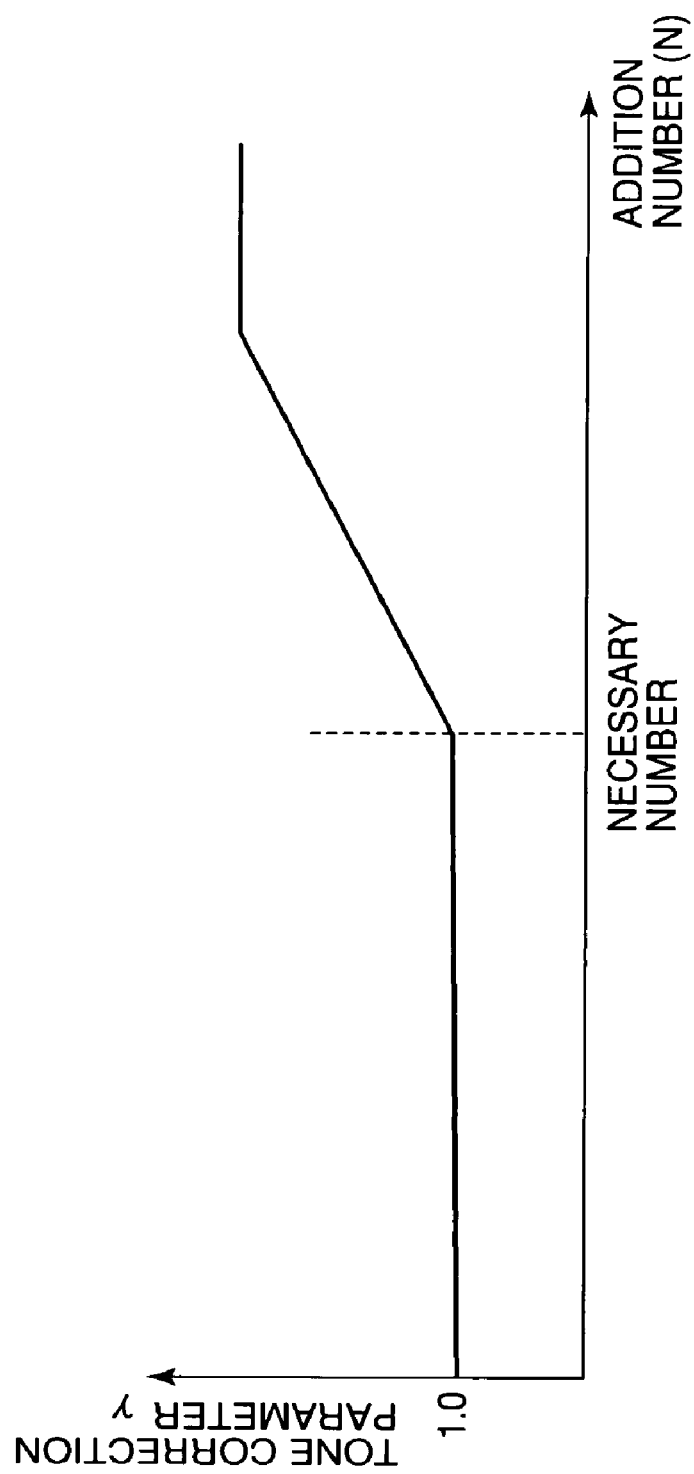
FIG. 8 is a diagram showing one example of a correspondence relation between the addition number and a tone correcting parameter concerning the tone adjusting processing by the digital camera shown in FIG. 1.

As shown in FIG. 8, the tone correcting parameter γ value is 1.0 and is constant until the number reaches the necessary number, and after the number reaches the necessary number, γ is gradually increased, and a dark portion is brightened. And if the γ value reaches a designated value, the brightness is set to a constant value.

With this, as shown in FIG. 4, only the brightness of the output image can be changed without changing the tone until the number reaches the necessary number, and after the number reaches the necessary number, the gain is set to a substantially constant value and the tone correcting parameter γ is increased. With this, it is possible to correct such that a dark portion is brightened while maintaining the brightness of a bright portion. If the addition number is further increased, the tone correcting parameter γ value becomes substantially constant, and images having substantially constant brightness are output thereafter.

If an addition number signal which is output from the addition number counter 5*l* and a necessary number signal which is output from the developing parameter calculator 5*m* are input, the comparator 5*r* compares these values. If the addition number becomes equal to or higher than the necessary number, the comparator 5*r* outputs an addition number-exceeding signal to the CPU 11 and the on-screen circuit 5*s*.

Based on an on-screen control signal which is output from the CPU 11, the on-screen circuit 5*s* outputs the necessary number which is the number of image frames required for synthesizing images which is output and input from the developing parameter calculator 5*m*, and the addition number which is the number of synthesized images (continuously taken images) which are output and input from the addition number counter 5*l*, in a superimposed manner on a preview image after the developing processing.

The on-screen circuit 5*s* outputs a progress bar concerning the brightness achievement ratio Lk which is output and input from the developing parameter calculator 5*m* in a superimposed manner on the preview image after the developing processing.

The brightness achievement ratio Lk is not limited to the display by the progress bar.

The image compressor 5*t* executes the image compressing processing for compressing a developed image which is output and input from the tone corrector 5*q* into a JPEG image based on a compression control signal which is output and input from the CPU 11.

The image compressor 5*t* compresses the developed image into the JPEG image, and outputs the same to an output image region in the memory 3 as a compression image signal.

The image processing apparatus 5 having the above-described structure is driven under control of the CPU 11, and functions as an image brightness adjusting section. That is, when images of a subject are continuously taken using the optical lens device 1 and the image sensor 2 in accordance with a user's pushing down operation of the shutter 6, the image processing apparatus 5 executes the image brightness adjusting processing in which the required synthesis number of image frames calculated by the developing parameter calculator 5*m* are added by the image adder 5*d*, and the brightness of the added image is adjusted such that a predetermined S/N value is obtained. More specifically, the image processing apparatus 5 changes the brightness adjusting parameter G before and after the brightness of the added image reaches the substantially same brightness as that of an image taken in the single picture-taking mode (normal picture-taking method), thereby changing the image brightness adjusting processing.

The image processing apparatus 5 is driven under the control of the CPU 11, and functions as a noise reducing section. That is, after the brightness of the added image reaches the substantially same brightness of an image taken in the single picture-taking mode, the image processing apparatus 5 executes the noise reducing processing in which an image frames are further added to the added image after the image brightness adjusting processing by the image adder 5*d* while a user pushes down the shutter 6, thereby reducing noise N of the added image. With this, the addition number of the image frames is increased, and the S/N value of the added image can be improved further.

The display device 4 includes a liquid crystal monitor on which an image is displayed. The display device 4 displays a preview which is temporarily stored in the memory 3 and a high-resolution real picture-taking image.

That is, the display device 4 sequentially displays images which are being synthesized by the image adder 5*d* during the image brightness adjusting processing in the continuous picture-taking mode. More specifically, as shown in FIGS. 9A to 12B, added images which gradually become brighter in the image brightness adjusting processing are sequentially displayed on the display device 4.

Figure 9A:
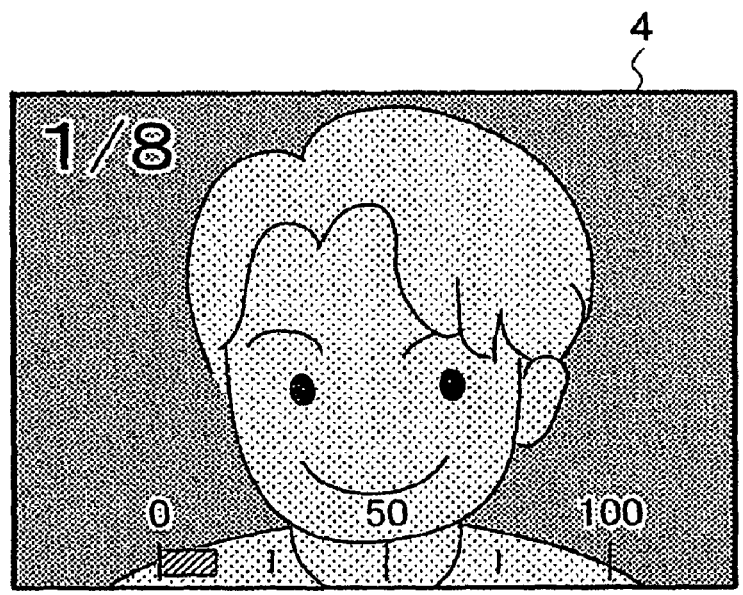
FIG. 9A is a schematic diagram showing an image of image brightness adjusting processing by the image processing apparatus shown in FIG. 2.
Figure 9B:
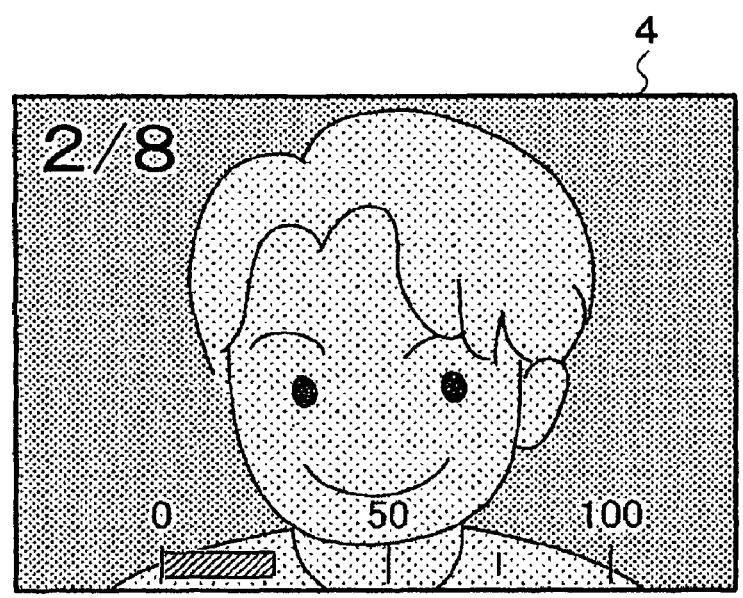
FIG. 9B is a schematic diagram showing an image of image brightness adjusting processing by the image processing apparatus shown in FIG. 2.
Figure 10A:
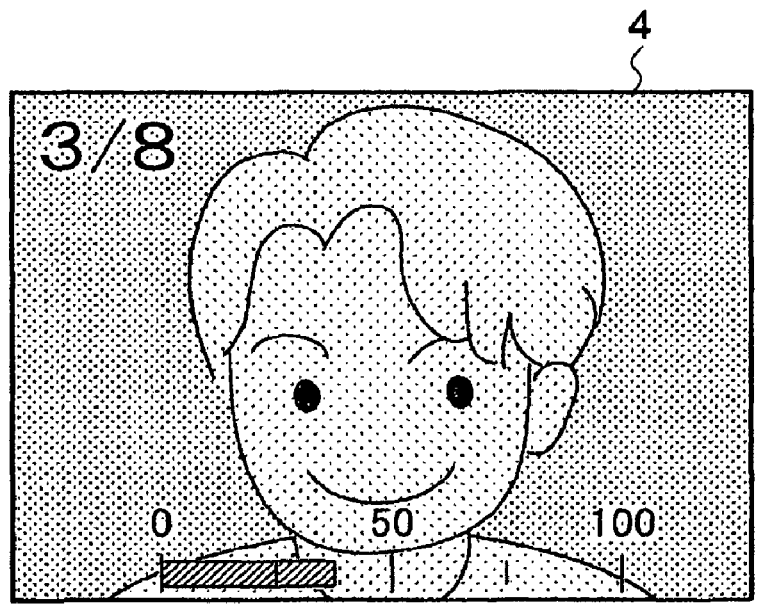
FIG. 10A is a schematic diagram showing an image of image brightness adjusting processing by the image processing apparatus shown in FIG. 2.
Figure 10B:
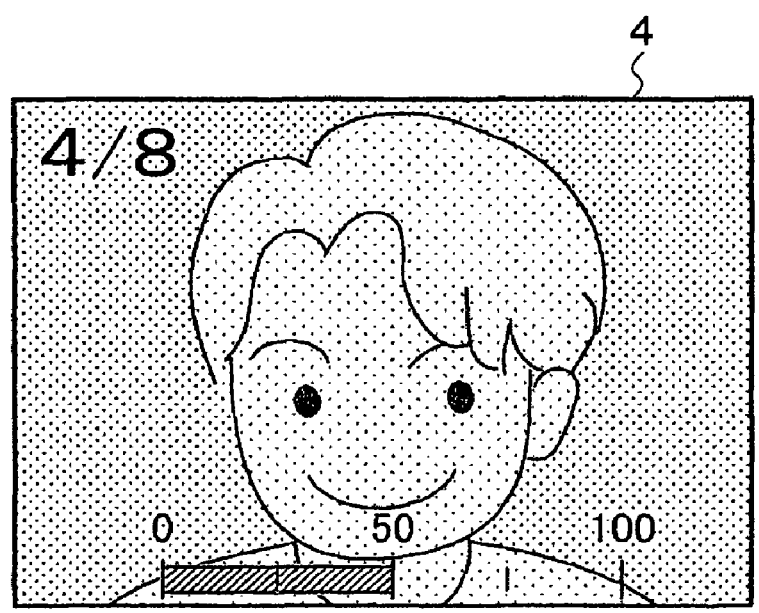
FIG. 10B is a schematic diagram showing an image of image brightness adjusting processing by the image processing apparatus shown in FIG. 2.
Figure 11A:
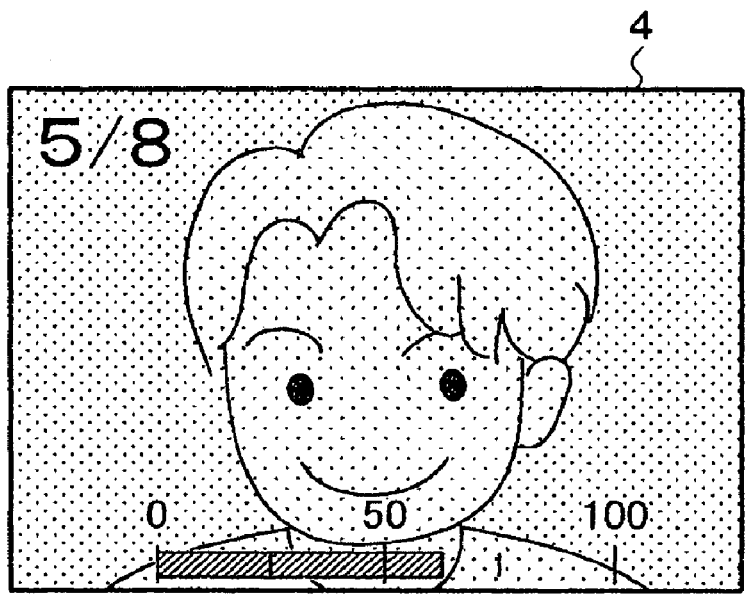
FIG. 11A is a schematic diagram showing an image of image brightness adjusting processing by the image processing apparatus shown in FIG. 2.
Figure 11B:
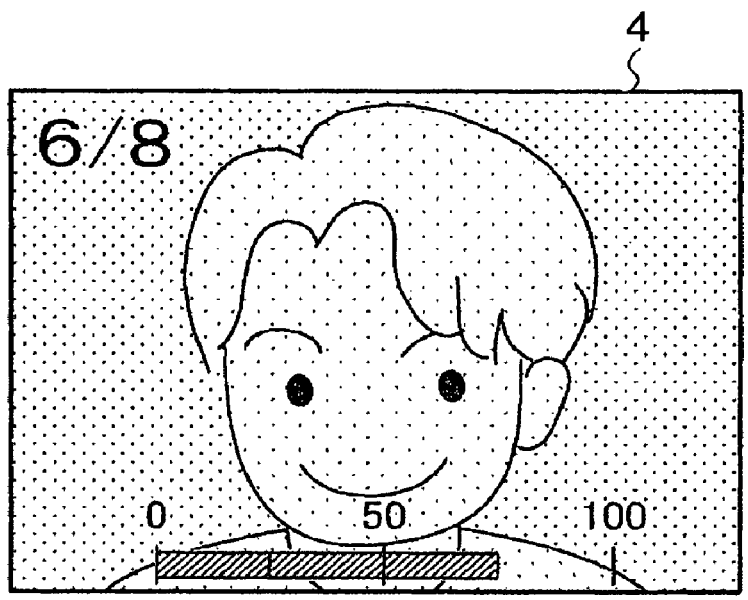
FIG. 11B is a schematic diagram showing an image of image brightness adjusting processing by the image processing apparatus shown in FIG. 2.
Figure 12A:
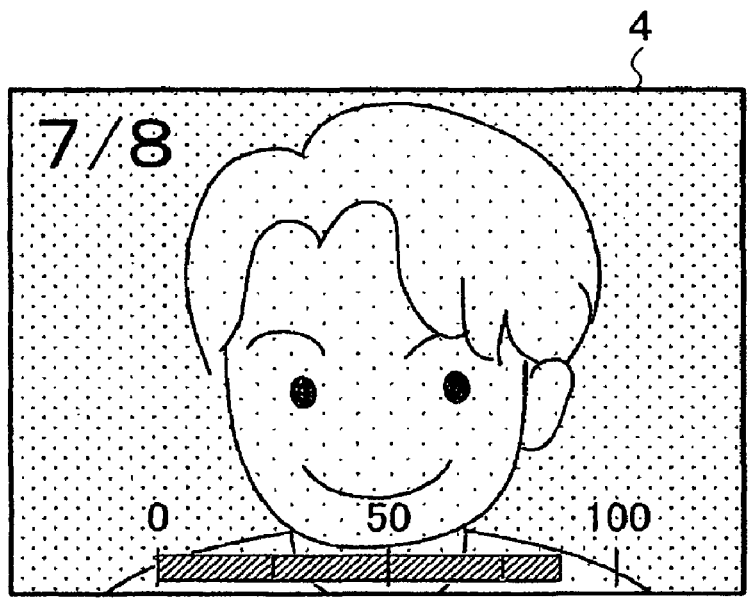
FIG. 12A is a schematic diagram showing an image of image brightness adjusting processing by the image processing apparatus shown in FIG. 2.
Figure 12B:
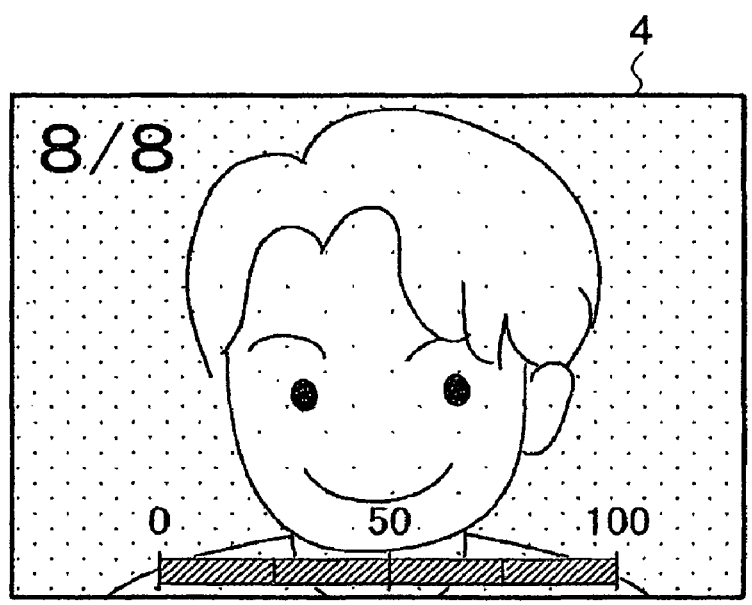
FIG. 12B is a schematic diagram showing an image of image brightness adjusting processing by the image processing apparatus shown in FIG. 2.

FIG. 9A shows an image of one image frame, FIG. 9B shows an image in which two image frames are added, FIG. 10A shows an image in which three image frames are added, FIG. 10B shows an image in which four image frames are added, FIG. 11A shows an image in which five image frames are added, FIG. 11B shows an image in which six image frames are added, FIG. 12A shows an image in which seven image frames are added, and FIG. 12B shows an image in which eight image frames are added.

In FIGS. 9A to 12B, as the number of dots on the image is higher, the image is darker.

The display device 4 displays an image after the noise reducing processing by the image processing apparatus 5. With this, as shown in FIGS. 13A and 13B, by increasing the addition number of the image frames, the brightness of the image (the number of dots of background of a person) is not changed from that shown in FIG. 12B, but clear images from which random noises N are gradually reduced, especially images in which the S/N value of a bright person portion is improved as compared with the background are displayed.

Figure 13A:
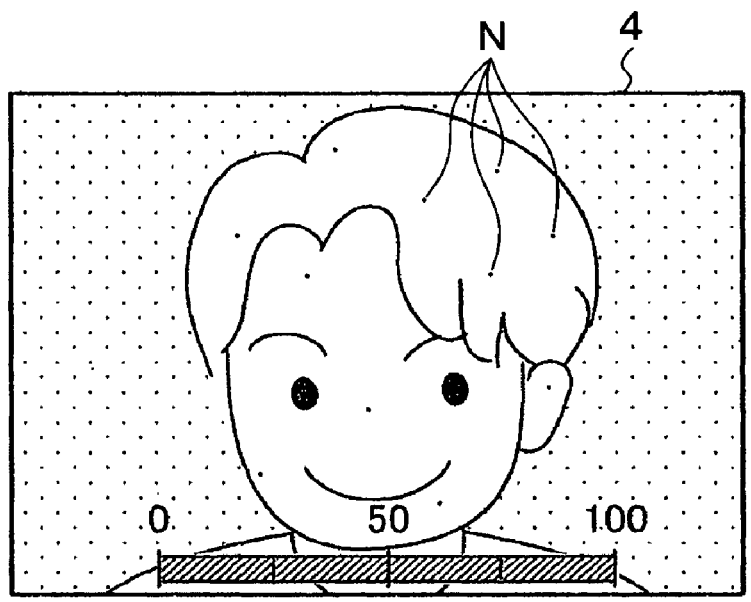
FIG. 13A is a schematic diagram showing an image of noise reducing processing by the image processing apparatus shown in FIG. 2.
Figure 13B:
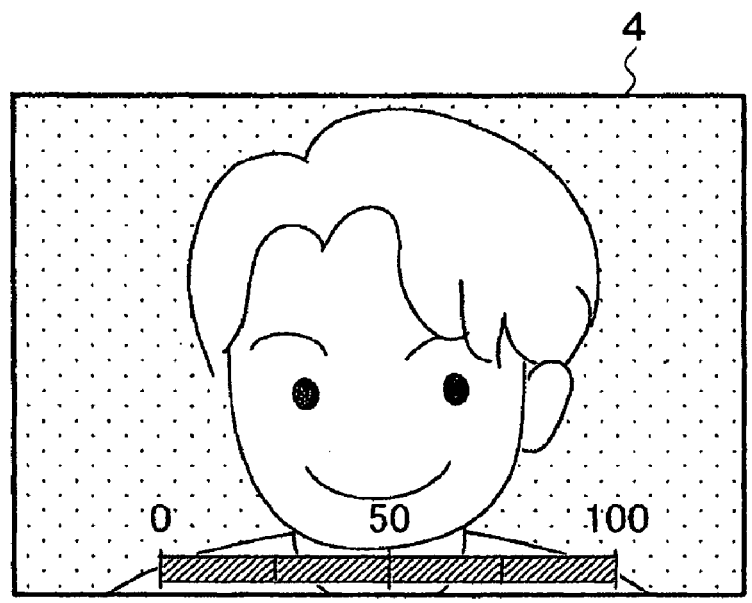
FIG. 13B is a schematic diagram showing an image of noise reducing processing by the image processing apparatus shown in FIG. 2.

FIG. 13A shows an image in which another image frame is added to the added image in FIG. 12B, and FIG. 13B shows an image in which more image frames are added to the added image in FIG. 13A.

The display device 4 shows the required synthesis number of the image frames calculated by the developing parameter calculator 5m, and the addition number (the number of image frames) which is counted and added by the addition number counter 5l, in a superimposed manner on the added image at the time of continuous picture-taking of a subject in the continuous picture-taking mode as the number display section. More specifically, as shown in FIGS. 9A to 12B, the display device 4 at its left and upper corner the required synthesis number as a denominator and the sequentially increasing addition number as a numerator. If the image frames of the required synthesis number is added, the display device 4 stops displaying the required synthesis number and the addition number.

The display device 4 shows a progress bar concerning the brightness achievement ratio Lk (%) of the added image in the superimposed manner on the added image. More specifically, as shown in FIGS. 9A to 13B, the display device 4 shows at its lower portion the progress bar which becomes long in accordance with the brightness achievement ratio Lk (%). In the progress bar, the left end is 0% and the right end is 100%.

When the digital camera 100 is connected to a computer (not shown), the computer IF section 8 functions as a USB storage class driver. With this, the computer connected to the digital camera 100 handles a memory card as an external storage device of the computer.

The external storage IF device 9 inputs and outputs image data to and from the memory card M.

The memory card M stores image data which is output from the external storage IF device 9 as an external storage device.

The program storage device 10 comprises a ROM and a flash memory, and stores a program which is executed by the CPU 11.

The CPU 11 controls the entire system collectively in accordance with a program stored in the program storage device 10.

More specifically, if operation information which is output based on a predetermined operation of the shutter 6 by a user is input, the CPU 11 controls the image sensor 2, the memory 3, the display device 4, the image processing apparatus 5 and the like based on the operation information, and carries out the picture-taking processing of an image and the developing processing. The CPU 11 instructs the memory card M to store high-resolution image data which is compressed in the JPEG format through the external storage IF device 9, and reads image data from the memory card M.

Next, the continuous picture-taking processing will be explained in detail with reference to FIG. 14.

Figure 14:
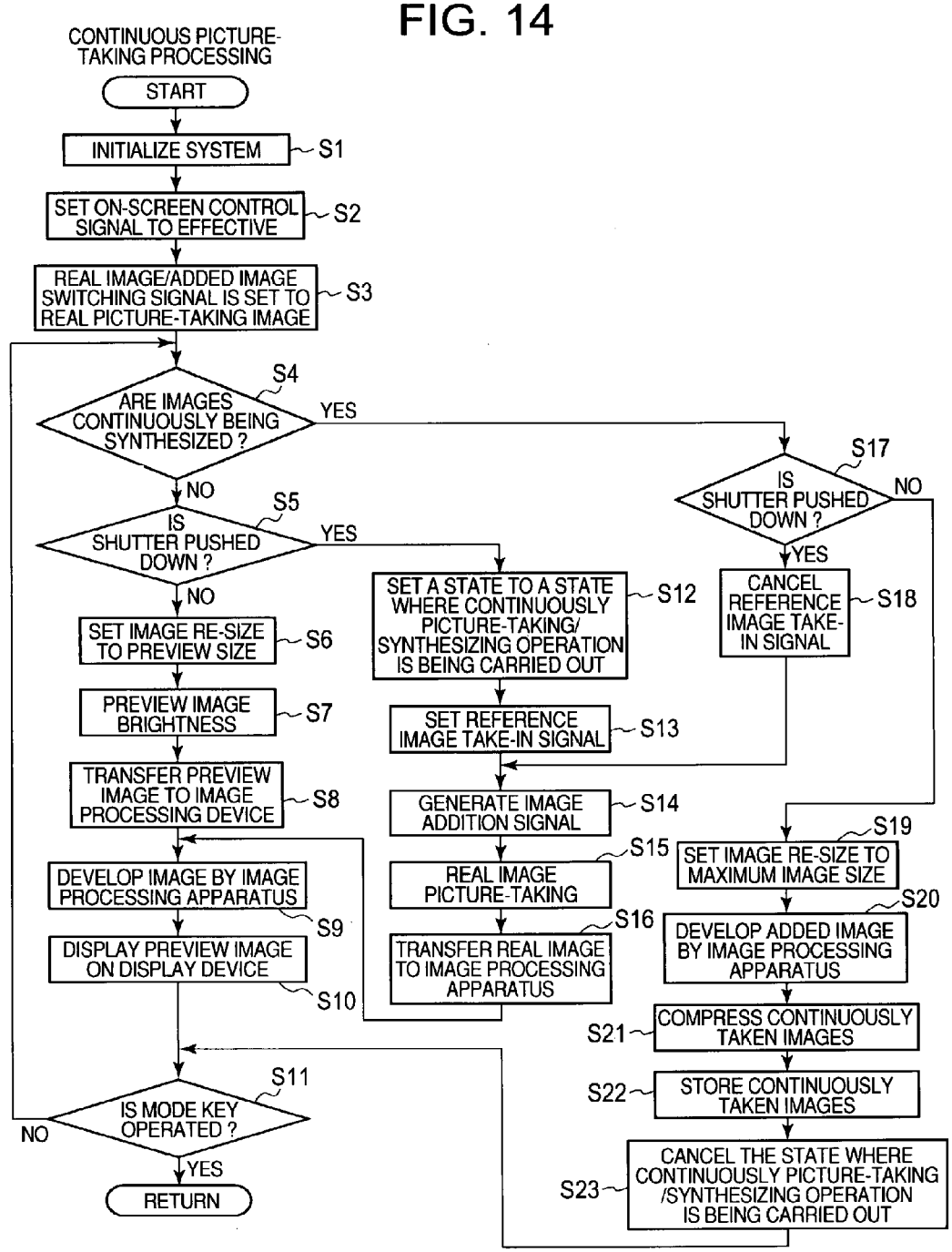
FIG. 14 is a flowchart showing one example of action concerning continuous picture-taking processing by the digital camera shown in FIG. 1.

FIG. 14 is a flowchart showing one example of action of the continuous picture-taking processing.

If the continuous picture-taking mode is selected by the predetermined operation of the mode key 7 by a user after power is turned ON, the CPU 11 brings the optical lens device 1, the image sensor 2, the image processing apparatus 5, the display device 4 and the like into their initial states (step S1).

Next, the CPU 11 brings various signals for controlling the image processing apparatus 5 into their continuous picture-taking initial states, and brings an on-screen control signal to "effective" unlike the single picture-taking action (step S2). With this, on-screen information is displayed on a preview image.

The CPU 11 sets a real image/added image switching signal into a real picture-taking image (step S3).

Then, the CPU 11 determines whether the continuous picture-taking and synthesizing is being carried out based on the continuous picture-taking and synthesizing signal (step S4). Here, since the continuous picture-taking and synthesizing signal is "0" in the initial state, it is determined that the CPU 11 determines that the continuous picture-taking and synthesizing is not being carried out (step S4; NO).

Then, it is determined whether a user pushes down the shutter 6 (step S5). When a user does not push down the shutter 6 (step S5; NO), the CPU 11 controls such that an image taken by the image sensor 2 is displayed on the display device 4.

Specifically, the CPU 11 sets an image re-size signal for the image processing apparatus 5 to a preview scale-down image size (step S6) and then, the image sensor 2 is controlled to produce a high speed preview frame (digital image data) having short exposure time (step S7), and outputs the preview image to the image processing apparatus 5 as an input image signal (step S8).

The image processing apparatus 5 carries out the developing processing of a preview image under the control of the CPU 11 (step S9). At that time, since the on-screen control signal is "effective", the image processing apparatus 5 overwrites the required synthesis number which is the number of image frames necessary for the image addition and the addition number which is the number of image addition (continuously picture-taking) on the preview image by the on-screen circuit 5s after the developing processing.

The CPU 11 controls the display device 4, reads a preview display region in the memory 3, and displays, on the display device 4, the preview image in which the necessary number and the addition number are displayed on-screen (step S10; see FIG. 9A).

With this, a user can recognize, on the display device 4, the number of images to be continuously taken and synthesized in accordance with brightness of a subject to be taken currently.

The CPU 11 determines whether a user operates the mode key 7 (step S11), and if it is determined that the mode key 7 is not operated, the procedure is shifted to step S4, where the execution of subsequent processing is controlled.

Then, if a user pushes down the shutter 6 (step S5; YES), the CPU 11 turns the continuous picture-taking and synthesizing signal into "1", and brings a state into a state where the continuous picture-taking and synthesizing operation is being carried out (step S12).

Then, the CPU 11 outputs a reference image take-in signal of the image processing apparatus 5 to the reference image storage section 5a (step S13).

Next, the CPU 11 produces an image addition signal and outputs the same to the addition number counter 5l (step S14).

Since the continuous picture-taking and synthesizing signal is "1", the signal is inverted into "0" by the inverting circuit 5k and is input to a clear signal terminal of the addition number counter 5l. Therefore, the clear control of the counter value is released. Thus, the addition number counter 5l adds 1 to the counter value by input of the image addition signal and thus, the addition number is turned to "1". Then, the addition number counter 5l outputs the addition number signal to the comparator 5r.

Then, the CPU 11 executes the real picture-taking processing of an image (step S15).

In the real picture-taking processing, the CPU 11 first sets the image re-size signal to a real picture-taking image size (maximum image size or the like). Then, the CPU 11 controls the image sensor 2 and produces a high-resolution digital image data for the real picture-taking.

The CPU 11 outputs the produced image data to the image processing apparatus 5 as an input image signal (step S16).

Then, the image processing apparatus 5 executes the developing processing of a real picture-taking image under the control of the CPU 11 (step S9) and then, the display device 4 displays a real picture-taking image in which the necessary number and the addition number are displayed on the on-screen (step S10).

When the mode key 7 is not operated (step S11; NO), the procedure is returned to step S4, but since the continuous picture-taking and synthesizing signal is "1", the CPU 11 determines that the continuous picture-taking and synthesizing is being carried out (step S4; YES).

Then, the CPU 11 determines whether a user pushes down the shutter 6 (step S17). If the user pushes down the shutter 6 (step S17; YES), the CPU 11 releases the output of the reference image take-in signal (step S18). With this, a second image and subsequent images are not stored in the reference image storage section 5a, and a state where the first image is retained is maintained.

Then, the procedure is shifted to step S14, the CPU 11 produces an image addition signal, adds "1" to the picture-taking number and carries out the real image picture-taking, and controls the execution of the reading processing of the image into the image processing apparatus 5 (steps S15 to 16).

In the image processing apparatus 5, whenever the reference image is read, motion amounts of the real image and the first image are detected by the motion detector 5b, the motion corrector 5c corrects in accordance with the motion correction amount, and the corrected image is added to the image stored in the added image storage section 5f. With this, a second image and subsequent images can be superposed on each other while correcting a synthesizing position in accordance with the motion amount. Therefore, even when a picture is taken using hand and hand jiggle is generated, an image having not deviation is added and the images are synthesized.

Then, the procedure is shifted to step S9, the image processing apparatus 5 executes the developing processing of the real picture-taking image under the control of the CPU 11 and then, the display device 4 displays a real shot image on which the necessary number and the addition number are displayed on screen under the control of the CPU 11 (step S10).

The above operation is repeatedly carried out as long as a user pushes the shutter 6 (step S17; YES).

That is, the image brightness adjusting processing is executed, the image frames are sequentially added, and the added images whose brightness is gradually increased are synthesized (see FIGS. 9A to 12B). The noise reducing processing after the image brightness adjusting processing is executed, the image frames are further added more than necessary number, the random noise N is gradually reduced and clear images are synthesized (see FIGS. 13A and 13B).

In addition, the tone adjusting processing is executed, and the tone of the added image is adjusted in accordance with the addition number of the image frames. With this, a user can easily find the addition number of the image frames, and can easily known the releasing timing of the pushing operation of the shutter 6.

If the number of added images becomes equal to or higher than the necessary number during the execution of the image brightness adjusting processing, i.e., if the addition number signal which is output from the addition number counter 5l and a value of the necessary number signal which is output from the developing parameter calculator 5m are compared with each other by the comparator 5r and the addition number becomes equal to or higher than the necessary number, the comparator 5r outputs the addition number-exceeding signal to the CPU 11.

Then, the CPU 11 controls the on-screen circuit 5s and release the on-screen display of the addition number and the necessary number (see FIG. 13A).

If the push-down operation of the shutter 6 is released (step S17; NO), the CPU 11 changes the image re-size to an image size of the picture-taking image (step S19) and then, the CPU 11 controls the image processing apparatus 5, reads the added image stored in the image adder 5d, and carries out the developing processing of the image (step S20). Concretely, the read added image is output to the image re-sizing section 5h and the image brightness information detector 5i through the selection circuit 5g. The image re-sizing section 5h outputs the taken image to the brightness adjustor 5p while maintaining its size as it is, and the brightness adjustor 5p adjusts the brightness of the image and outputs the same to the image compressor 5t.

The image processing apparatus 5 instructs the image compressor 5t to carry out the image compressing processing, and outputs the compressed image signal to an output image region in the memory 3 (step S21).

Then, the CPU 11 reads the compressed image data from the memory 3, outputs the same to the external storage IF device 9, and stores the same in the memory card M (step S22).

The CPU 11 releases the production of the continuous picture-taking and synthesizing signal "1", and terminates the continuous picture-taking processing (step S23).

As described above, according to the digital camera 100 of the first embodiment, the halfway added image to which a predetermined number of image frames are added can be displayed. Therefore, a developed image is dark until its brightness reaches a target value, and a user can wait until the image becomes bright while checking the brightness of the image in the preview image. Especially, the tone adjusting processing is executed, the tone of the added image is adjusted in accordance with the addition number of the image frames, a user can easily found the addition number of the image frames, and can easily know the releasing timing of the push-down operation of the shutter 6.

In this manner, a user can know a state in which the brightness of added images to be synthesized by the digital camera 100 is appropriately adjusted. Thus, the user can know the picture-taking state, and it is possible to provide a digital camera 100 having excellent usability for a user.

Further, it is possible to calculate the required synthesis number of image frames in the continuous picture-taking processing based on the brightness of images of a subject obtained in the picture-taking state of the preview image, to synthesize the required synthesis number of image frames in the image brightness adjusting processing, and to appropriately adjust the brightness of the added image. Thus, it is possible to solve the conventional problem that images more than necessary must be taken to avoid shortage of the required synthesis number caused by a change in picture-taking conditions of a subject.

When a user holds a camera so as not to jiggle his or her hand during the continuous picture-taking processing, it is possible to on-screen display the required synthesis number and addition number of the image frames on the display device 4 to inform the user of the information.

The noise reducing processing is carried out after the image brightness adjusting processing. With this, it is possible to further improve the S/N value of the added image. Therefore, it is possible to synthesize clear images having reduced random noise N, especially images in which the S/N value in a person portion brighter than background is improved.

The required synthesis number of image frames necessary for an added image produced by the image adder 5d to obtain almost the same brightness as that of a image taken in the normal single picture-taking mode (picture-taking method) is previously calculated in the first embodiment based on the brightness of an image of (input image) of a subject, but the present invention is not limited to this, and it is not always necessary to previously calculate the required synthesis number of image frames. That is, whenever an added image is produced, its brightness may be compared with that of an image taken in the normal single picture-taking mode and it may determine whether the brightness is almost the same instead of determining whether the number reaches "the necessary number" by the comparator 5r.

When the addition number becomes equal to or higher than the necessary number, the on-screen display of the addition number and the necessary number is released in the embodiment. However, the invention is not limited to this, and an image number-exceeding signal which is output from the comparator 5r is input to a color control terminal of the on-screen circuit 5s of the image processing apparatus 5, the display color of the addition number may be changed.

Second Embodiment

A digital camera of a second embodiment will be explained with reference to FIGS. 15 to 17.

Figure 15:
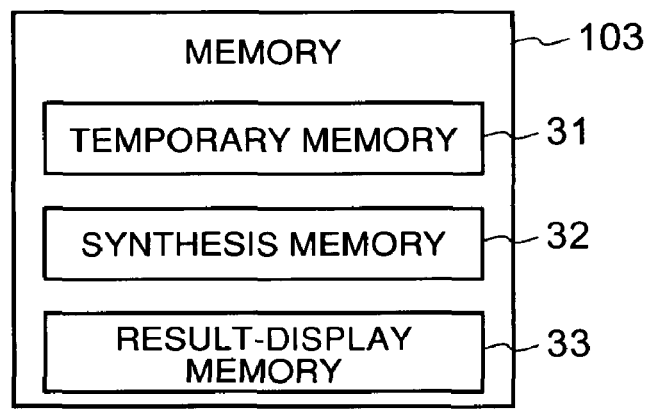
FIG. 15 is a block diagram showing a structure of an essential portion of a memory provided in a digital camera according to a second embodiment to which the invention is applied.

FIG. 15 is a block diagram showing a structure of an essential portion of a memory provided in the digital camera of the second embodiment to which the present invention is applied.

According to the digital camera of the second embodiment, whenever the predetermined number of image frames are added by the image processing apparatus 5, added images produced as a result of the addition are displayed on the display device 4.

In the digital camera of the second embodiment, whenever the predetermined pieces of image frames are added, added images produced as a result of the addition are displayed. Except this point, the second embodiment is substantially the same as the first, embodiment, and detailed explanation thereof will be omitted.

That is, as shown in FIG. 15, a memory 103 of the digital camera includes a temporarily storing temporary memory 31. In addition to this, the memory 103 also includes a synthesis memory 32 in which an added image which is produced whenever an image frame is added is overwritten and stored, and a result-display memory 33 for storing a display image of a result of addition produced when a predetermined number of image frames are added.

An added image is produced whenever a predetermined number (e.g., five) image frames are added by the image adder 5d. The result-display memory 33 stores the added image during the image brightness adjusting processing as an image storing section.

The display device (image display section) 4 displays the added image which is stored in the result-display memory 33 in accordance with the addition number of image frames and which is read from the result-display memory 33.

Figure 16:
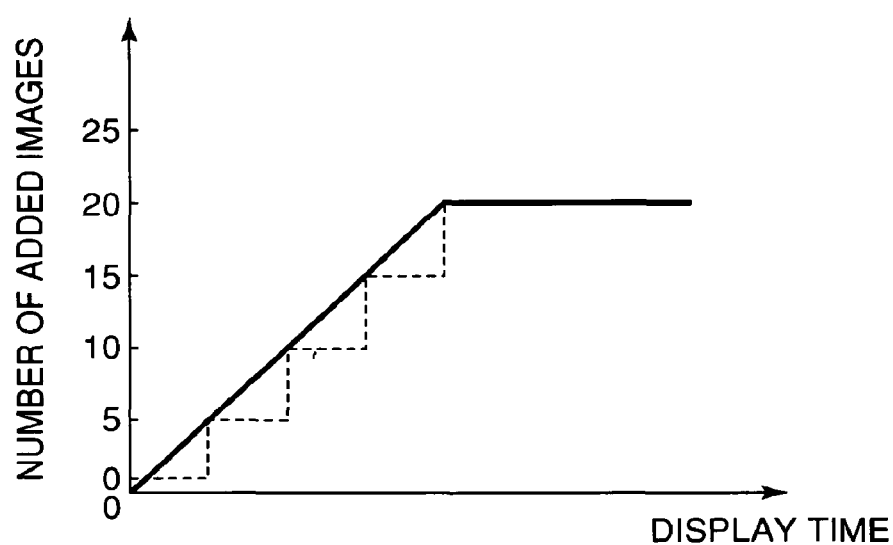
FIG. 16 is a schematic diagram showing a correspondence relation between the number of image frames to be added concerning the continuous picture-taking processing by the digital camera shown in FIG. 1 and display time of the added image.
Figure 17:
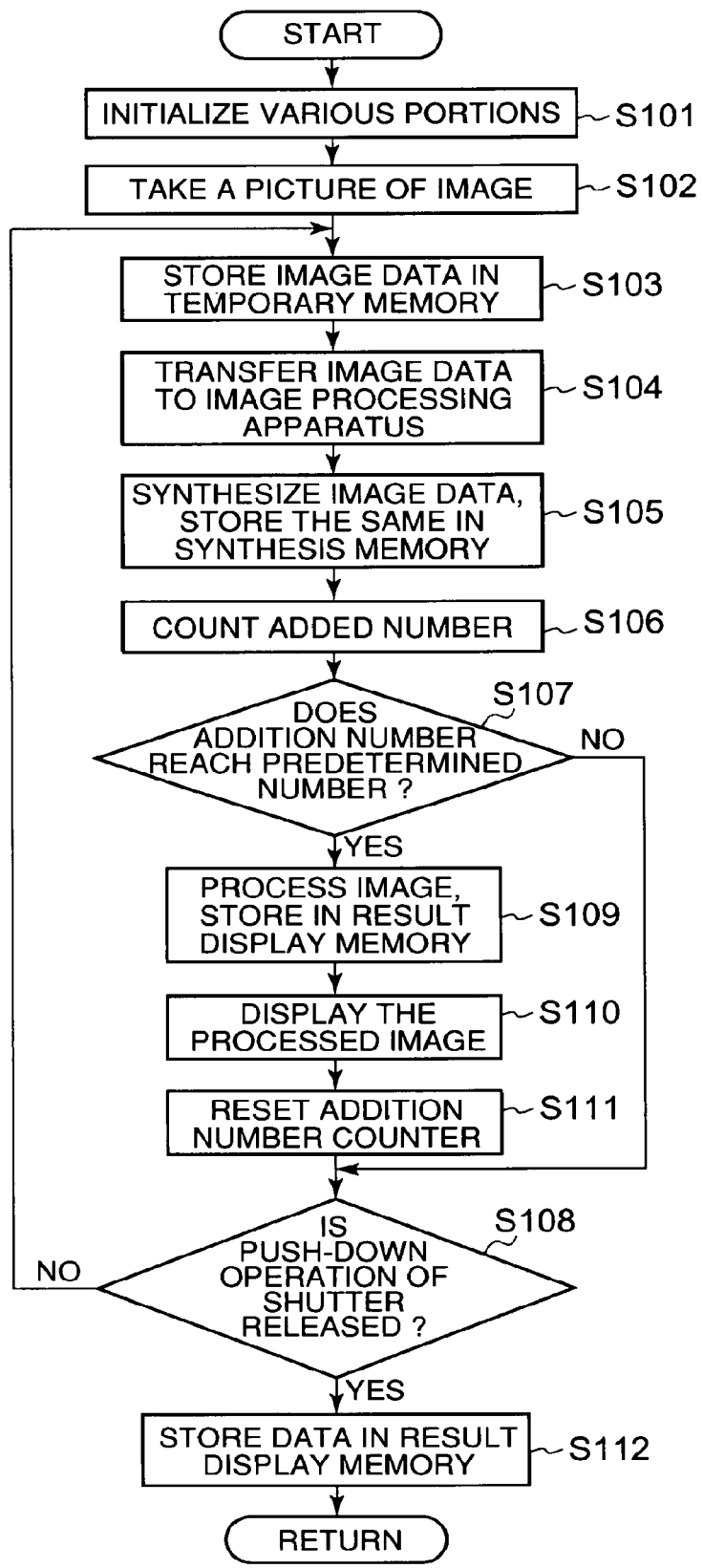
FIG. 17 is a flowchart showing one example of motion of the continuous picture-taking processing by the digital camera shown in FIG. 15.

With this, as shown in FIG. 16, a first image is taken, the first image is displayed on the display device 4, when five image frames are added, the five added image is displayed on the display device 4, and when five more image frames are added, the ten added image is displayed on the display device 4. In this manner, an added image to which the predetermined number of image frames is displayed stepwisely until the addition number reaches the required synthesis number (e.g., 20).

In FIG. 16, the solid line shows an addition number, and a broken line shows a displayed image.

Next, the continuous picture-taking processing will be explained in detail with reference to FIG. 18.

Figure 18:
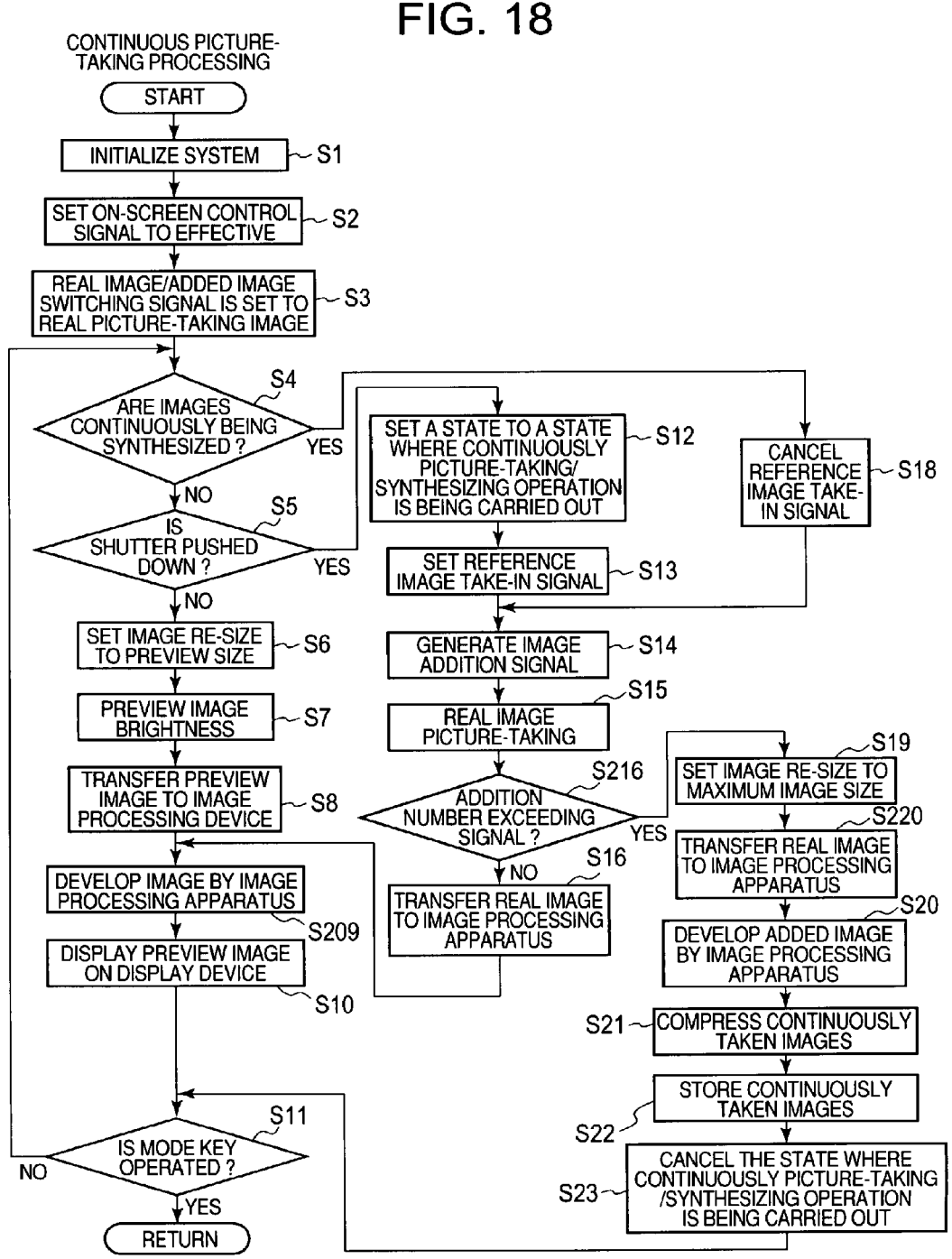
FIG. 18 is a flowchart showing one example of motion of the continuous picture-taking processing by a digital camera according to a third embodiment to which the invention is applied.

Here, FIG. 18 is a flowchart showing one example of action of the continuous picture-taking processing.

If the continuous picture-taking mode is selected by the predetermined operation of the mode key 7 by a user after power is turned ON, the CPU 11 brings the optical lens device 1, the image sensor 2, the image processing apparatus 5, the display device 4 and the like into their initial states (step S101).

Then, if the user pushes down the shutter 6, the CPU 11 controls the various portions of the digital camera, and starts continuous picture-taking of a subject (step S102).

Image data is obtained by taking the subject using the optical lens device 1 and the image sensor 2, and the image data is transferred to the temporary memory 31 of the memory 103 and stored therein under the control of the CPU 11 (step S103).

Then, the CPU 11 obtains the image data from the temporary memory 31 and transfers the same to the image processing apparatus 5 (step S104).

The image processing apparatus 5 adds the input image data and data of an added image in the synthesis memory 32 to produce an added image and then, overwrites the same in the synthesis memory 32 and stores the same (step S105). When the image data transferred to the image processing apparatus 5 in step S104 is image data of the first image frame, since image data stored in the synthesis memory 32 does not exist, data of the first image frame is stored in the synthesis memory 32.

Next, if "1" is added to the addition number (counter value) by a predetermined counter (not shown) (step S106), the CPU 11 determines whether the addition number reaches the predetermined number (e.g., five) (step S107).

If the CPU 11 determines that the addition number does not reach the predetermined number (step S107; NO), the CPU 11 determines whether the push-down operation of the shutter 6 by a user is released (step S108).

If the push-down operation of the shutter 6 by a user is not released, i.e., when the shutter 6 is still being pushed down, the procedure is shifted to step S103, and the CPU 11 control the execution of subsequent processing.

The addition of image frames is repeatedly carried out, and if it is determined that the addition number reaches the predetermined number in step S107 (step S107; YES), the CPU 11 reads image data of the added image stored in the synthesis memory 32, carried out working processing for displaying the image data on the display device 4 and then, the processed image data is transferred to the result-display memory 33 and stored therein (step S109).

The CPU 11 transfers the processed image data to the display device 4, and the processed image data to which the predetermined number of image frames are added is displayed (step S110).

Then, the CPU 11 resets the counter value of the counter, and the procedure is shifted to step S108.

In step S108, if it is determined that the push-down operation of the shutter 6 by a user is released (step S108; YES), the CPU 11 terminates the continuous picture-taking processing, transfers the image data of the added image in the result-display memory 33 to the memory card M and stores the same in the memory card M (step S112).

According to the digital camera of the second embodiment, the result-display memory 33 is provided in addition to the synthesis memory 32 in which the added image is stored, and the added image stored in the result-display memory 33 is renewed whenever the predetermined number of image frames are added. Therefore, the load of the image processing apparatus 5 concerning the developing processing for displaying an image can be reduced.

Further, even if the continuous picture-taking processing is executed while a user pushes down the shutter 6, the added image held in the result-display memory 33 is displayed unlike an image to which image frames are sequentially added, a user can take an image while checking the added image, it is possible for a user to prevent a time lag from generating after an added image having appropriate brightness until the push-down operation of the shutter 6 is released, and it is possible to prevent an image of exposure time over from being stored.

Although a picture-taking result is transferred to and stored in the memory card M in the first and second embodiments, the present invention is not limited to this, a saving memory may be provided in an internal storage device such as the memory 103, and the information may be stored in the saving memory.

The addition number of image frames of added image stored in the result-display memory 33 may be changed manually by a user, or may be automatically changed in accordance with brightness or exposure time.

Third Embodiment

A digital camera of a third embodiment of will be explained below.

According to the digital camera of the third embodiment, the image brightness adjusting processing is executed based on one push-down operation of the shutter 6 by a user, the necessary number of image frames are added (synthesized) by the image adder 5d, the added images, the necessary number and the number of taken images are on-screen displayed on the display device 4.

That is, the CPU 11 controls the optical lens device 1, the image sensor 2 and the like based on the one push-down operation of the shutter 6 by a user in the continuous picture-taking mode, and controls the execution of the continuous picture-taking operation of a subject. That is, if the shutter 6 is once pushed down by a user, even if the shutter 6 is not pushed down thereafter, images are continuously taken up to the necessary number, and the image frames are added.

At that time, the image processing apparatus 5 executes the image brightness adjusting processing for adding the required synthesis number of image frames by the image adder 5d to produce a synthesis image. More specifically, the image brightness adjusting processing is executed until it is determined that the addition number becomes equal to or higher than the necessary number by the comparator 5r of the image processing apparatus 5 in the continuous picture-taking processing.

The developing parameter calculator 5m adjusts gain based on the image brightness information which is output and input from the image brightness information detector 5i such that brightness of an output image from the average value in a histogram becomes equal to predetermined brightness which is almost the same as that of an image which is taken in single picture-taking processing. More specifically, when the average value in the histogram is low, since an input image is dark, the developing parameter calculator 5m increases a brightness gain such that the image becomes bright, and when the average value is high, since the input image is bright, the brightness gain is reduced such that the image becomes dark.

With this, the brightness of an added image is not adjusted in accordance with the addition number, and it is possible to display, on the display device 4, an added image having brightness which is assumed after adding images by obtaining a preview display or a first image frame of the real picture-taking image.

Next, the continuous picture-taking processing will be explained in detail with reference to FIG. 18.

FIG. 18 is a flowchart showing one example of motion of the continuous picture-taking processing by a digital camera according to a third embodiment.

If a preview image is taken under the control of the CPU 11 like the first embodiment and the image is output to the image processing apparatus 5 (steps S1 to S8), the image processing apparatus 5 carries out the developing processing of the preview image under the control of the CPU 11 (step S209).

In this developing processing, the brightness adjustor 5p of the image processing apparatus 5 adjusts the gain such that the brightness of the output image becomes substantially equal to that of an image taken in the single picture-taking processing based on the brightness adjusting parameter which is output and input from the developing parameter calculator 5m.

After a preview image on which the necessary number and the addition number are on-screen displayed on the display device 4 (step S10), if a user pushes down the shutter 6 and a real image is taken (steps S11 to S15), the CPU 11 determines whether there is an addition number-exceeding signal which is output and input from the comparator 5r (step S216).

If it is determined that the addition number-exceeding signal is not input (step S216; NO), the procedure is shifted to step S16, and the CPU 11 controls execution of subsequent processing.

After the continuous picture-taking and synthesizing of second and subsequent image frames is started and the output of the reference image take-in signal is released (step S18), if it is determined in step S216 that the addition number-exceeding signal is input to the CPU 11 (step S216; YES), the CPU 11 sets the image re-size to an image size of a real image and then, the CPU 11 outputs the produced image data to the image processing apparatus 5 as an input image signal (steps S19 and S220).

Next, the procedure is shifted to step S20, and the CPU 11 controls execution of subsequent processing.

According to the digital camera of the third embodiment, if a user once pushes down the shutter 6, even if the shutter 6 is not pushed down thereafter, the necessary number of images are continuously taken, and added images to which the image frames are added can be obtained. Thus, a digital camera having excellent usability can be provided. When the digital camera is placed on a predetermined position utilizing a tripod, the digital camera can be used in a picture-taking state where a hand jiggle is not caused almost at all.

[First Modification]

In the first to third embodiments, the progress bar of the brightness achievement ratio Lk is on-screen displayed on the display device 4, but the progress bar may not be displayed.

Figure 19:
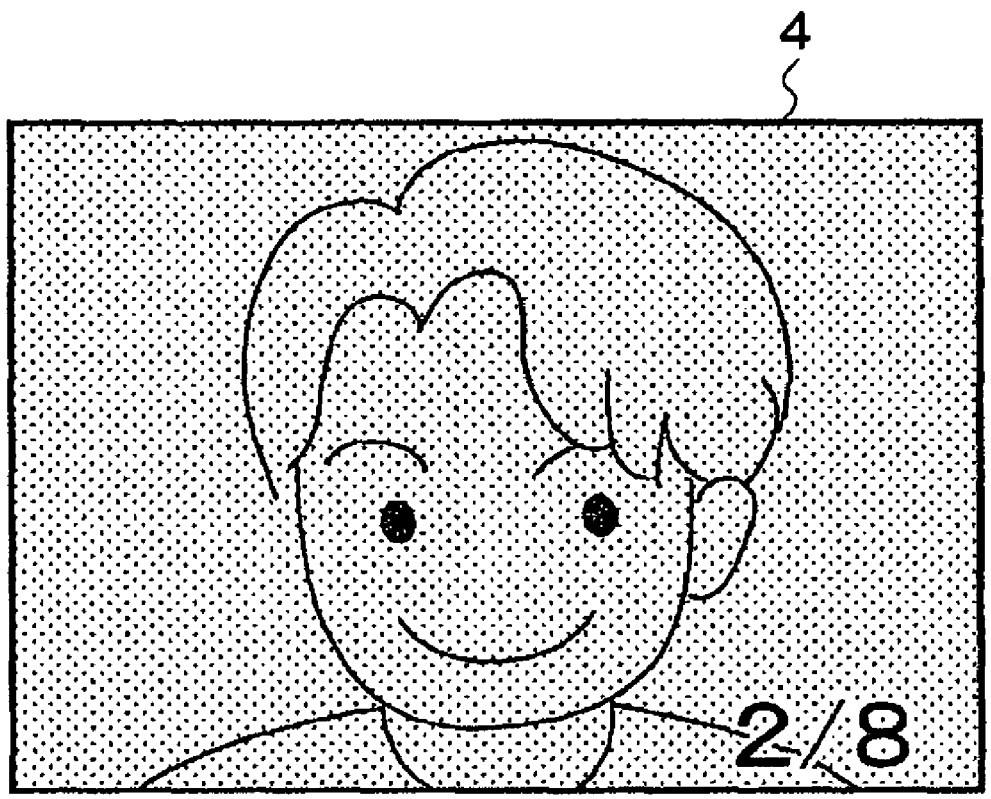
FIG. 19 is a schematic diagram showing an image concerning the continuous picture-taking processing by a digital camera of a first modification.
Figure 21D:
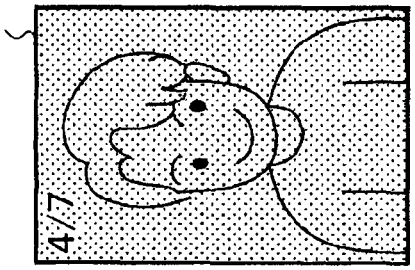
FIG. 21D is a schematic diagram showing an image concerning the continuous picture-taking processing by the digital camera shown in FIG. 20.
Figure 21C:
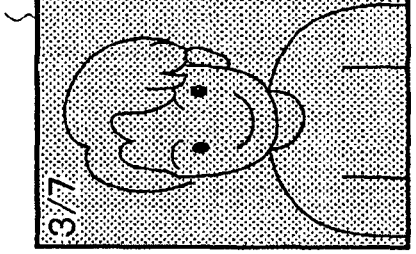
FIG. 21C is a schematic diagram showing an image concerning the continuous picture-taking processing by the digital camera shown in FIG. 20.
Figure 21B:
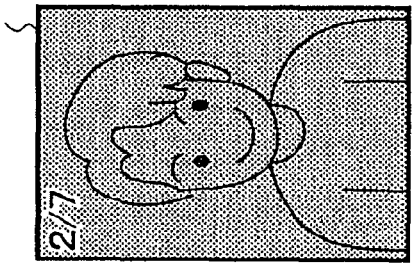
FIG. 21B is a schematic diagram showing an image concerning the continuous picture-taking processing by the digital camera shown in FIG. 20.
Figure 21A:
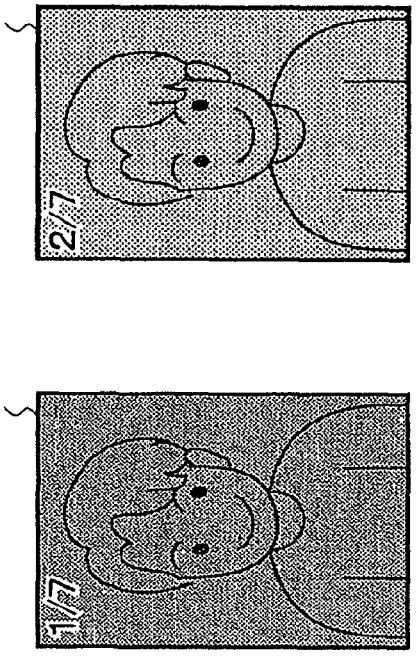
FIG. 21A is a schematic diagram showing an image concerning the continuous picture-taking processing by a digital camera shown in FIG. 20.
Figure 21G:
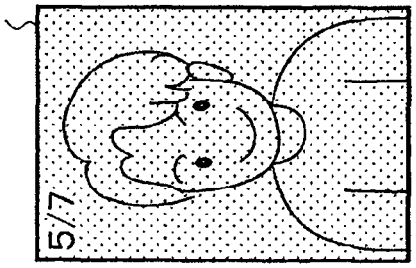
FIG. 21G is a schematic diagram showing an image concerning the continuous picture-taking processing by the digital camera shown in FIG. 20.
Figure 21F:
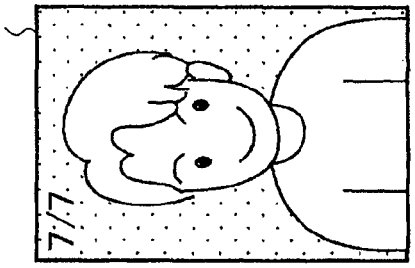
FIG. 21F is a schematic diagram showing an image concerning the continuous picture-taking processing by the digital camera shown in FIG. 20.
Figure 21E:
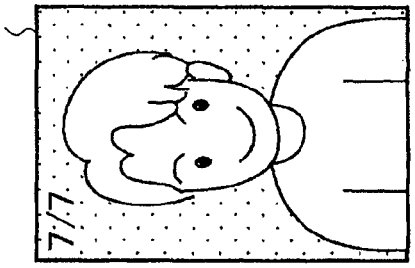
FIG. 21E is a schematic diagram showing an image concerning the continuous picture-taking processing by the digital camera shown in FIG. 20.

That is, according to the digital camera of the first modification, as shown in FIG. 19, the display device 4 shows a required synthesis number as a denominator and shows the sequentially increasing addition number as a numerator at a right and lower corner of its display screen.

[Second Modification]

In the first to third embodiments, the noise reducing processing and the tone adjusting processing are executed in addition to the image brightness adjusting processing, but the noise reducing processing and the tone adjusting processing may not be executed.

That is, the digital camera of the second modification does not have the necessary brightness fixed numeric value storage section 5o and the tone corrector 5q, executes only the image brightness adjusting processing, adds image frames and produces an added image as shown in FIG. 20.

With this, as shown in FIGS. 21A to 21G, an image when addition of the necessary number of (seven) image frames is completed is stored in the memory card M as the added image.

If the digital camera executes at least the image brightness adjusting processing, the camera may execute the image brightness adjusting processing and the noise reducing processing, or may execute the image brightness adjusting processing and the tone adjusting processing (not shown).

The present invention is not limited to the first to third embodiment, and various improvements and changes in design may be made in a range not departing from a subject matter of the invention.

EXPLANATION OF REFERENCE NUMERALS

100 digital camera (image pickup apparatus)
2 image sensor (picture-taking section)
4 display device (number display section, halfway-image display section, image display section)
5 image processing apparatus (image brightness adjusting section, noise reducing processing)
5d image adder (image synthesizing section)
5l addition number counter (synthesis number measuring section)
5m developing parameter calculator (required synthesis number calculating section)
5q tone corrector (tone adjusting section)
6 shutter (picture-taking operation input section)
33 result-display memory (image storing section)

What is claimed is:

1. An image pickup apparatus comprising:
    a picture-taking section to continuously take images of a subject to output a plurality of image frames;
    an image synthesizing section to synthesize the plurality of image frames to produce a synthesized image;
    an image brightness adjusting section which allows the image synthesizing section to synthesize the image frames and executes image brightness adjusting processing for adjusting a brightness of the synthesized image while the images of the subject are continuously taken; and
    a partway-image display section to display a partway synthesized image of the synthesized image, which is produced by the image synthesizing section in the image brightness adjusting processing,
    wherein the image brightness adjusting section changes the image brightness adjusting processing between before and after the brightness of the synthesized image becomes almost equal to a brightness of an image taken by a normal picture-taking method.

2. The image pickup apparatus according to claim 1, wherein:
    each of the images taken by the picture-taking section is exposed for a shorter time than the image taken by the normal picture-taking method,
    the image synthesizing section synthesizes the image frames by detecting a motion amount of the subject between the image frames, and adjusting a position to synthesize the image frames in accordance with the motion amount, and
    the image brightness adjusting section executes the image brightness adjusting processing by changing a brightness adjusting parameter value or a tone correcting parameter value.

3. The image pickup apparatus according to claim 1, further comprising:
    a tone adjusting section which executes tone adjusting processing for adjusting tone of the synthesized image,
    wherein the tone adjusting section changes the tone adjusting processing between before and after the brightness of the synthesized image produced by the image synthesizing section becomes almost equal to the brightness of the image taken by the normal picture-taking method.

4. The image pickup apparatus according to claim 1, further comprising:
    a number calculating section to calculate a required synthesis number of the image frames required for the synthesized image produced by the image synthesizing section to obtain a predetermined brightness based on a brightness of an image of the images of the subject taken by the picture-taking section;
    a number measuring section to measure a number of the image frames synthesized by the image synthesizing section;
    a number display section to display the required synthesis number calculated by the number calculating section and the number measured by the number measuring section while the picture-taking section takes the images of the subject; and
    a display changing section to change a display status of the required synthesis number calculated by the number calculating section and the number measured by the number measuring section, which are displayed on the number display section, when the number measured by the number measuring section becomes equal to or more than the required synthesis number calculated by the number calculating section.

* * * * *